(12) United States Patent
Mori et al.

(10) Patent No.: US 8,305,236 B2
(45) Date of Patent: Nov. 6, 2012

(54) OPTICAL RECEIVING APPARATUS, SHIELD PLATE, COMPUTER PRODUCT, TRANSIT SUPPORT METHOD, AND TRANSIT SUPPORT APPARATUS

(75) Inventors: Shinichiro Mori, Kawasaki (JP); Yuichiro Noguchi, Kawasaki (JP); Kazuo Hida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 632 days.

(21) Appl. No.: 12/565,268

(22) Filed: Sep. 23, 2009

(65) Prior Publication Data

US 2010/0019937 A1 Jan. 28, 2010

Related U.S. Application Data

(63) Continuation of application No. PCT/JP2008/051128, filed on Jan. 25, 2008.

(30) Foreign Application Priority Data

Mar. 28, 2007 (JP) ................... 2007-084108
Jul. 10, 2007 (JP) ................... 2007-181248

(51) Int. Cl.
G08G 1/01 (2006.01)
G06F 19/00 (2006.01)
G06K 9/00 (2006.01)
H04N 7/18 (2006.01)
(52) U.S. Cl. ......... 340/936; 701/119; 382/104; 348/149
(58) Field of Classification Search .................. 340/936; 701/119; 382/104; 348/149
See application file for complete search history.

(56) References Cited

FOREIGN PATENT DOCUMENTS

| JP | 8-293092 | 11/1996 |
|---|---|---|
| JP | 11-296793 | 10/1999 |
| JP | 2003-30781 | 1/2003 |
| JP | 2003-107143 | 4/2003 |
| JP | 2003-109184 | 4/2003 |

OTHER PUBLICATIONS

International Search Report (Form PCT/ISA/210), mailed Apr. 22, 2008, in corresponding International Application No. PCT/JP2008/051128.
Form PCT/ISA/220, mailed Apr. 22, 2008, in corresponding International Application No. PCT/JP2008/051128.
Form PCT/ISA/237, mailed Apr. 22, 2008, in corresponding International Application No. PCT/JP2008/051128.
International Preliminary Report on Patentability, mailed Sep. 29, 2009, in corresponding International Application No. PCT/JP2008/051128.
International Preliminary Report on Patentability, mailed Sep. 29, 2009, in corresponding International Application No. PCT/JP2008/051128 (7 pp.).
English Translation of the International Preliminary Report on Patentability mailed Oct. 29, 2009 and issued in corresponding International Patent Application PCT/JP2006/051128.

*Primary Examiner* — Brian Zimmerman
*Assistant Examiner* — Omeed Alizada
(74) *Attorney, Agent, or Firm* — Staas & Halsey LLP

(57) ABSTRACT

An optical receiving apparatus is provided on a mobile object and includes a receiving unit that receives an optical signal transmitted from a transmitting unit of a communication device disposed apart from the mobile object; and a blocking unit that blocks the optical signal when an incident angle of the optical signal relative to a disposition surface of the receiving unit becomes equal to or greater than a predetermined incident angle.

14 Claims, 29 Drawing Sheets

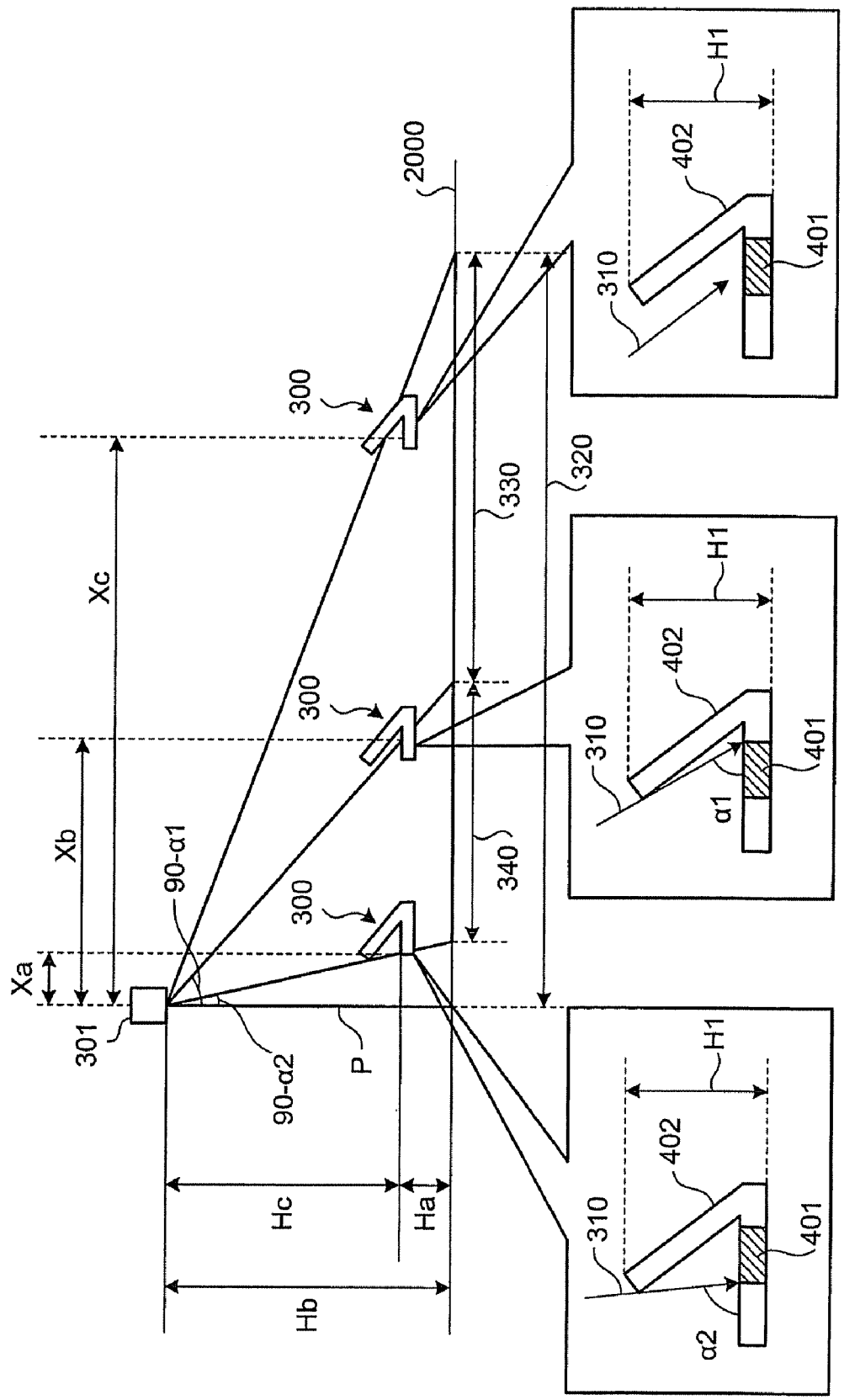

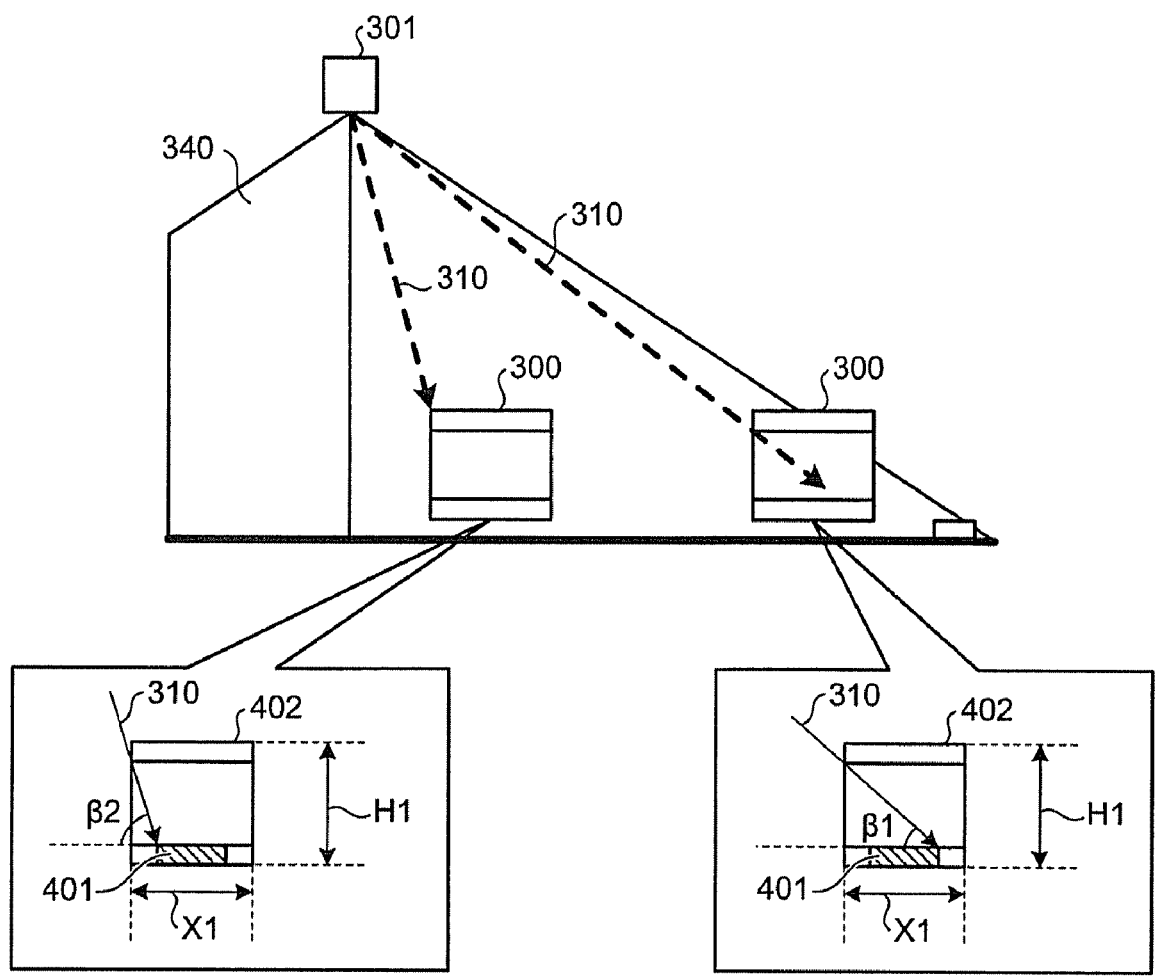

FIG.8

| CONSIDERATIONS | | PARAMETERS | ERRORS [cm] |
|---|---|---|---|
| TRAVELING POSITION | MIDDLE OF ROAD | DIRECTLY BELOW TRANSMITTING UNIT | 37 |
| | EDGE OF ROAD | 1.8 m TOWARD EDGE FROM POINT DIRECTLY BELOW TRANSMITTING UNIT | 28 |
| VEHICLE HEIGHT | STANDARD SIZED VEHICLE | VEHICLE HEIGHT OF 1 m | 37 |
| | LARGE SIZE VEHICLE | VEHICLE HEIGHT OF 2 m | 19 |
| VEHICLE SPEED | HIGH SPEED | 110 km/h | 21 |
| | LOW SPEED | 30 km/h | 37 |

OPTICAL RECEIVING APPARATUS, SHIELD PLATE, COMPUTER PRODUCT, TRANSIT SUPPORT METHOD, AND TRANSIT SUPPORT APPARATUS

This application is a continuation application, filed under 35 U.S.C. §111 (a), of International Application No. PCT/JP2008/051128, filed Jan. 25, 2008, and claims priority to Japanese Application No. 2007-084108, filed Mar. 28, 2007, and Japanese Application No. 2007-181248, filed Jul. 10, 2007, the disclosures of which are herein incorporated in their entirety by reference.

FIELD

The embodiments discussed herein are related to an optical receiving apparatus, a shield plate provided on the optical receiving apparatus, a transit support computer product, method, and apparatus.

BACKGROUND

Recently, advanced safety services providing information/giving warning/performing intervention control for vehicles based on position information of mobile objects such as vehicles to reduce traffic accidents, have gained attention. Specifically, for example, an advanced safety service is a service that prevents traffic accidents due to blind spots, carelessness, and oversight on the part of a driver by providing position information concerning the vehicle operated by the driver as well as other vehicles, signal information, and sign information to a vehicle entering a predetermined range from an intersection, a bend, etc., (e.g., within 100 m from a center portion).

With such advanced safety services, highly accurate position location is required with respect to the vehicle position of the driver, which is provided to other vehicles and compared with the positions of other vehicles, signals (or stop line), and signs. Specifically, for example, if the position of another vehicle provided by the advanced safety service is different from the position of the vehicle visually recognized by the driver, the driver feels confused or uncomfortable and therefore, a position locating error with respect to each of the vehicles is desirably within a half-length of a vehicle (e.g., about 2.5 m).

Currently, vehicle position locating technologies include Global Positioning Systems (GPS) utilized for car navigation systems. However, if a vehicle is surrounded by trucks and buses having higher vehicle heights or if the vehicle travels in an urban area with high-rise buildings randomly located, position location through GPS may become inaccurate due to poor tracking of GPS satellites, the occurrence of multipaths, etc.

On the other hand, autonomous navigation in which the distance traveled by a vehicle is measured by vehicle speed pulses, an acceleration sensor, a gyroscope, etc., is known to have fewer errors in the case of traveling within a predetermined range. Specifically, for example, an error of a travel distance for autonomous navigation is 2.0 m or less for travel within an advanced safety service area (e.g., about 100 m) where the above advanced safety service is provided. Therefore, if accurate position location is performed upon entry to the advanced safety service area, highly accurate position location (e.g., within an error of 2.5 m) is enabled in the advanced safety service area via the autonomous navigation.

Technologies of accurate position location at the position of entry into an advanced safety service area include Ultra Wide Band (UWB), magnetic markers, and ultrasonic positioning.

The position location at the position of entry into the advanced safety service area is also performed through the utilization of optical beacons, which are existing infrastructure facilities, instead of UWB, magnetic markers, ultrasonic positioning, etc. Position location utilizing optical beacons is a technique of correcting a vehicle positioning result of GPS with the use of position information of an optical beacon included in an optical signal emitted by the optical beacon, for example.

For the reception of an optical signal emitted from an optical beacon, it has been proposed to provide a cover on a receiving unit of an on-vehicle device to block optical signals from outside the communication area of the optical beacon passed by a vehicle (see e.g., Japanese Laid-Open Patent Publication No. H11-296793).

It has been proposed to detect passage of a vehicle through a boundary of a communication area where an on-vehicle device communicates with an optical beacon, to correct the boundary position to the vehicle's current position at the time of the detection (see e.g., Japanese Laid-Open Patent Publication No. 2003-107143).

A conventional method of position location using an optical beacon will be described with reference to FIG. 19. FIG. 19 is an explanatory diagram of a position locating system using an optical beacon. As depicted in FIG. 19, a position locating system 1900 is made up of an optical beacon 1901 and an on-vehicle device 1903 equipped on a vehicle 1902.

The optical beacon 1901 is disposed on a roadside and through the on-vehicle device 1903, transmits and receives various signals 1910 with respect to the vehicle 1902 traveling in a communication area 1920. Specifically, for example, the various signals 1910 transmitted/received include downlink (DL) signals transmitted from the optical beacon 1901 to the on-vehicle device 1903 and uplink signals transmitted from the on-vehicle device 1903 to the optical beacon 1901.

More specifically, for example, the DL signals are optical signals that include road traffic information distributed from a Vehicle Information and Communication System (VICS, registered trademark) center, position information related to the position of the optical beacon 1901, ID (identifier) information of the optical beacon 1901, etc.

The on-vehicle device 1903, using an optical receiving apparatus not depicted, receives optical signals emitted from the optical beacon 1901 to locate the current position of the vehicle 1902 through GPS, autonomous navigation, etc. Specifically, for example, the on-vehicle device 1903 is configured to locate the current position by correcting a positioning result of the vehicle 1902 using position information related to the position of the optical beacon 1901 acquired from the optical signal received by the optical receiving apparatus.

The communication area 1920 is an area where the optical beacon 1901 and the on-vehicle device 1903 may communicate and is a range of a distance L along the traveling direction of the vehicle 1902 and a width W along the vehicle width direction, for example. The on-vehicle device 1903 is configured to locate the current position of the vehicle 1902 using the optical signal received at a position within the range of the communication area 1920.

However, if UWB, magnetic markers, ultrasonic positioning, etc., are utilized to accurately perform the position location in the above conventional technologies, a new device must be equipped on the vehicle, imposing burden and cost to the driver.

On the other hand, if the position location is performed with the use of the optical beacons, which are increasingly deployed as infrastructure facilities, to constrain the burden and cost to the driver, errors may occur depending on the range of a communication area of an optical beacon. An error may occur because the position of reception of the optical signal is different from the position of the optical beacon.

Specifically, for example, since a predefined communication area of an optical beacon extends about three to four meters in the vehicle traveling direction and the vehicle width direction, an error in the vehicle position location may be as much as three to four meters. Even if optical signals from outside the communication area such as from the opposite traffic lane are blocked in Japanese Laid-Open Patent Publication No. H11-296793, an error occurs in the vehicle position location depending on the range of the communication area of the optical beacon emitting the optical signal that is received.

Japanese Patent Application Laid-Open Publication No. 2003-107143 recites that a boundary position predefined for an optical beacon is corrected to a current position of a vehicle at the time of detection of the boundary of the communication area through the reception of an optical signal. However, the range of the communication area of the optical signal varies because of weather conditions such as rain and fog, dirt on optical signal transmitting/receiving units, reduced reception sensitivity due to blocking by wipers, etc., and contrarily, may be as much as 12 m.

Therefore, if an error occurs between the detected boundary position and the predefined boundary position, error in the vehicle position location increases. Even at a position that is not the predefined boundary position, an error occurs between the detected boundary position and the predefined boundary position by receiving the optical signal from the optical beacon.

If an error occurs in the vehicle position location and the appropriate position location of the current position is unfeasible, the driver misperceives the positional relationship between the vehicle of the driver and a feature such as a traffic signal and an intersection, causing unnecessary confusion and an uncomfortable feeling.

Particularly, with the advanced safety service, when safe travel by vehicles is promoted through the utilization of relative positions of the vehicle of the driver and another vehicle, the driver is put at risk by an error in the position location of the current position of the other vehicle provided from the other vehicle.

SUMMARY

According to an aspect of an embodiment, an optical receiving apparatus is provided on a mobile object and includes a receiving unit that receives an optical signal transmitted from a transmitting unit of a communication device disposed apart from the mobile object; and a blocking unit that blocks the optical signal when an incident angle of the optical signal relative to a disposition surface of the receiving unit becomes equal to or greater than a predetermined incident angle.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is an explanatory diagram of a cross section of the blocking of an optical signal by a receiving unit according to the first embodiment;

FIG. 5B is a front view of the blocking of the optical signal by the receiving unit according to the first embodiment;

FIG. 8 is an explanatory diagram of an example of a reference position setting result according to the first embodiment;

DESCRIPTION OF EMBODIMENTS

Preferred embodiments of the present invention will be explained with reference to the accompanying drawings.

In the embodiments, description will be made of an example in which the optical receiving apparatus is implemented by an optical receiving apparatus connected to an on-vehicle device such as a navigation apparatus equipped on a mobile object such as a vehicle (including four-wheel vehicles and two-wheel vehicles).

Figure 1:
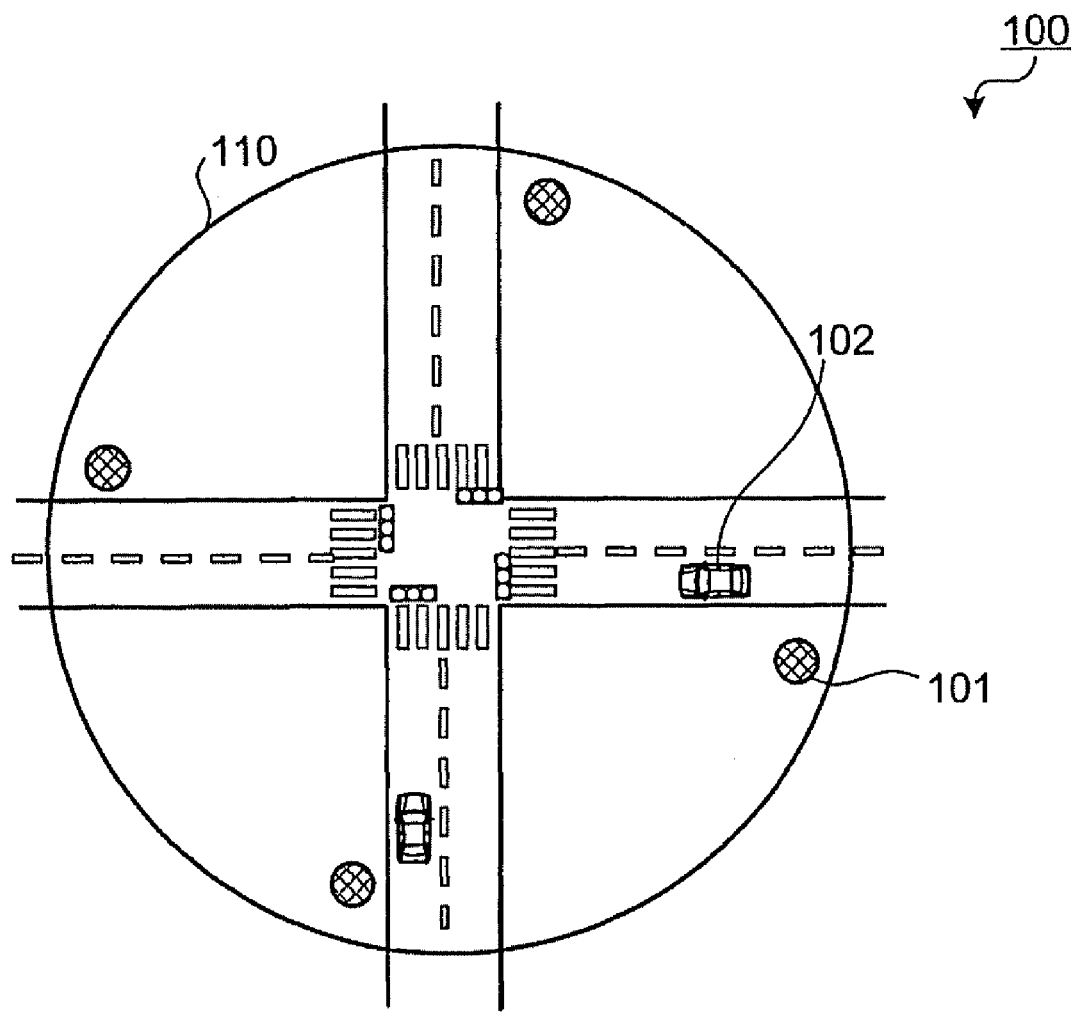
FIG. 1 is an explanatory diagram of a position locating system according to a first embodiment.

FIG. 1 is an explanatory diagram of a position locating system according to a first embodiment.

As depicted in FIG. 1, a position locating system 100 according to the first embodiment is a system that uses a roadside device 101 such as an optical beacon to determine the position of a vehicle 102 traveling in an advanced safety service area 110 where an advanced safety service is provided.

Specifically, for example, the advanced safety service is a service that prevents traffic accidents due to blind spots, carelessness, and oversight of a driver by providing position information concerning the vehicle of the driver and other vehicles, traffic signal information, and sign information to a vehicle entering the advanced safety service area 110 within a predetermined range from an intersection, a bend, etc., (e.g., within 100 m from a center portion).

Figure 2:
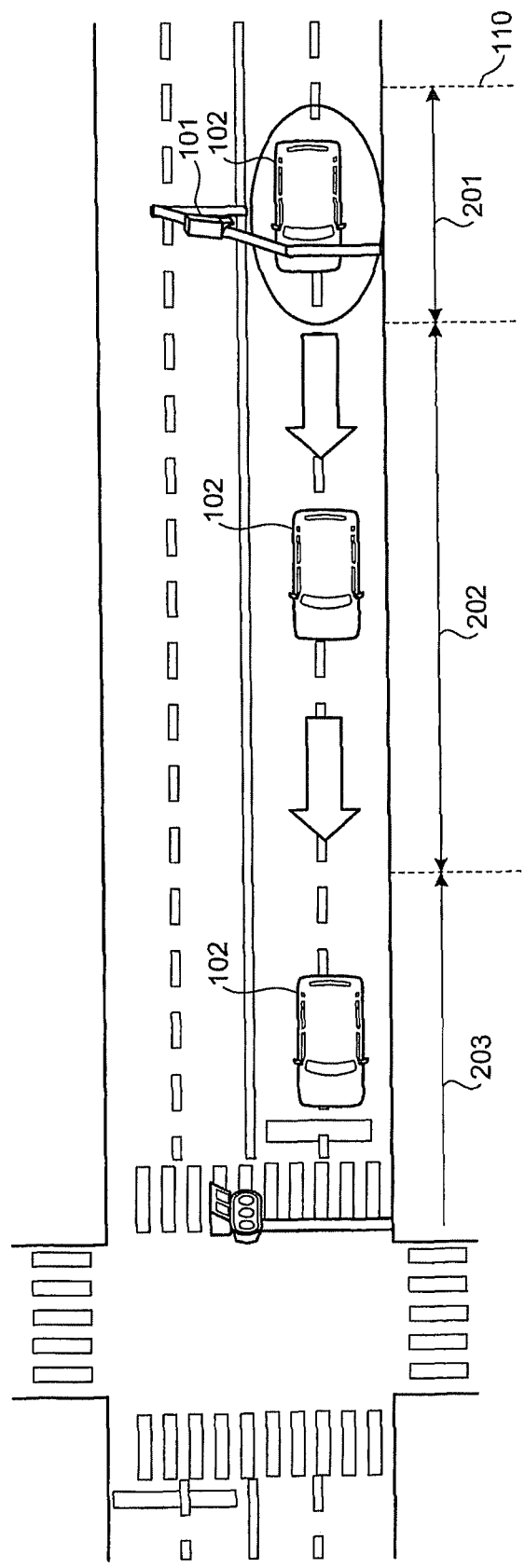
FIG. 2 is an explanatory diagram of a vehicle entering an advanced safety service area according to the first embodiment.

FIG. 2 is an explanatory diagram of a vehicle entering the advanced safety service area 110 according to the first embodiment.

As depicted in FIG. 2, the advanced safety service area 110 is made up of an initial value setting area 201, an autonomous positioning area 202, and a high-accuracy positioning area 203.

The vehicle 102 entering the advanced safety service area 110 passes under the roadside device 101 such as an optical beacon and travels toward an intersection (the center of the advanced safety service area 110).

Specifically, for example, the vehicle 102 enters the advanced safety service area 110 and while traveling in the initial value setting area 201 uses an optical signal received from the roadside device 101 to set an initial value related to determining the position of the vehicle 102 in the advanced safety service area 110. The initial value is, for example, a reference position serving as a reference for autonomous positioning by an on-vehicle device, not depicted, equipped on the vehicle and may be configured to be set using the position of the roadside device 101.

Subsequently, the vehicle 102 travels in the autonomous positioning area 202 and performs autonomous positioning using the initial value set in the initial value setting area 201. The autonomous positioning area 202 may be a range of about 20 to 80 m from the center of the intersection, for example.

While traveling in the high-accuracy positioning area 203, the vehicle 102 transmits the vehicle position through a communicating unit, not depicted, to other vehicles traveling in the high-accuracy positioning area 203 and receives the position of other vehicles and information concerning a traffic signal and signs. Communication in the high-accuracy positioning area 203 may be performed through vehicle-to-vehicle communication or a communication device disposed at the intersection, for example.

The above advanced safety service area 110 achieves traffic safety by accurately determining the position of the vehicle of the driver and other vehicles in the high-accuracy positioning area 203. Specifically, for example, an error in the position location within the high-accuracy positioning area 203 is desirably within a half-length of a vehicle (e.g., about 2.5 m) so as not to make a driver misperceive the positional relationship between the vehicle of the driver and other vehicles. Errors occurring with the autonomous positioning are known to be within about 2.0 m for a range similar to the advanced safety service area 110 (e.g., 100 m).

Therefore, for the error of the position location to be within a target range, error of the initial value set in the initial value setting area 201 is within 0.5 m.

Figure 3:
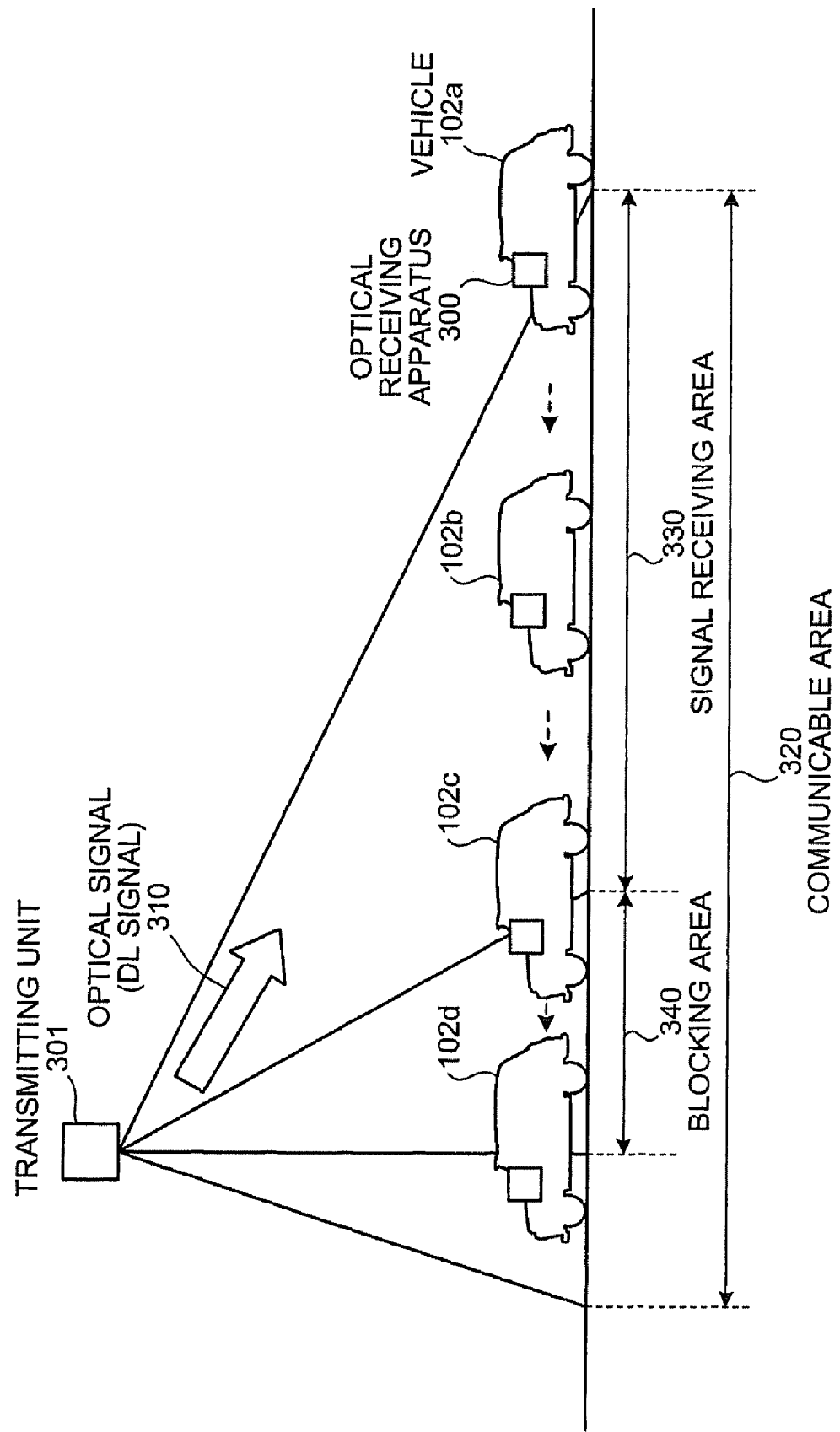
FIG. 3 is an explanatory diagram of an initial value setting according to the first embodiment.

FIG. 3 is an explanatory diagram of the initial value setting according to the first embodiment.

As depicted in FIG. 3, an optical receiving apparatus 300 is equipped on the vehicle 102 (102a, 102b, 102c, and 102d) and receives an optical signal 310 transmitted from a transmitting unit 301 of the roadside device 101 depicted in FIGS. 1 and 2.

The transmitting unit 301 is disposed on the roadside device 101 and transmits the optical signal 310 to the vehicle 102 traveling in a communicable area 320. Specifically, for example, the optical signal 310 is a downlink (DL) signal that includes road traffic information, position information related to the position of the roadside device 101, ID information of the roadside device 101, etc.

The on-vehicle device, not depicted, acquires the position of the roadside device 101 from the position information included in the optical signal 310 received by the optical receiving apparatus 300. If the ID information of the roadside device 101 is received instead of the position information, the position of the roadside device 101 may be obtained using information concerning the roadside device 101 recorded in a database not depicted and the ID information.

The DL signal is a signal transmitted from a center to a terminal side of a network and is periodically transmitted to the vehicle 102 traveling in the communicable area 320 of the roadside device 101. The communicable area 320 is, for example, a range where the optical signal 310 transmitted from the transmitting unit 301 reaches the vehicle 102. More specifically, for example, although the area is predefined as 3.7 m for an optical beacon, the range varies because of weather conditions, dirt on the optical signal transmitting/receiving units, reduced reception sensitivity due to blocking by wipers, etc. and on the other hand, may be as much as 12 m.

Although not described in FIG. 3, communication may be performed with an uplink signal transmitted from the vehicle 102 to the roadside device 101 in addition to the optical signal 310 (DL signal) transmitted from the transmitting unit 301 in the communicable area 320. The uplink (UL) signal is, for example, a signal transmitted from the terminal side to the center of the network and is a signal that includes the vehicle ID, which is identification information concerning the vehicle 102.

Although details are described with reference to FIGS. 4, 5A, and 5B, the optical receiving apparatus 300 receives and blocks the optical signal 310 in the communicable area 320. Specifically, for example, the optical receiving apparatus 300 does not receive the optical signal 310 before the vehicle 102a enters the communicable area 320 and the optical receiving apparatus 300 receives the optical signal 310 when the vehicle 102b enters a signal receiving area 330 in the communicable area 320.

When the vehicle 102c enters a blocking area 340 in the communicable area 320, the optical receiving apparatus 300 starts to block the optical signal 310, and when the vehicle 102d exits the blocking area 340, the optical signal 310 is completely blocked and is not received.

Therefore, by setting a boundary position where the optical signal 310 is no longer received due to a blocking of the optical signal 310, the optical receiving apparatus 300 is able to set a highly accurate reference position used as an initial value for the autonomous positioning. By defining the boundary position identified from the position of the roadside device 101 as the reference position for the autonomous positioning, the position location of the vehicle 120 is performed accurately within the advanced safety service area 110 depicted in FIG. 1.

As the optical signal strength from the beacon is unstable in the vicinity of the reception start position (corresponding to a portion near the right end of the communicable area 320 of FIG. 3) and the ending area (corresponding to a portion near the left end of the communicable area 320 of FIG. 3), position detection may be inaccurate depending on vehicle type, glass transmissivity, vehicle height, etc. According to the present embodiments, the light may be blocked at a point where optical signal strength is strong and does not inhibit a defined reception range. Since reception of the optical signal may be blocked at a place where the strength of the optical signal is high, i.e., an area where sensitivity is unstable due to weakness of the optical signal may be eliminated, the position location of the vehicle 120 is be performed accurately.

The boundary position for terminating the reception of the optical signal 310 may be set at a point less affected by the surrounding environment of the transmitting unit 301, for example. Specifically, for example, the boundary position is set at the point directly below the transmitting unit 301 where the distance to the optical receiving apparatus 300 is short and the reception sensitivity is less affected because the strength of the optical signal 310 is high. The effect of the height of the vehicle 102 may be constrained to a minimum at the point directly below the transmitting unit 301.

The boundary position may be set according to a boundary position of an area ensuring minimal communication defined by the specifications of the transmitting unit 301 (the roadside device 101), for example. By setting the boundary position according to the area ensuring minimal communication, the optical signal 310 is received and blocked with certainty and therefore, the boundary position may be detected precisely.

Figure 4:
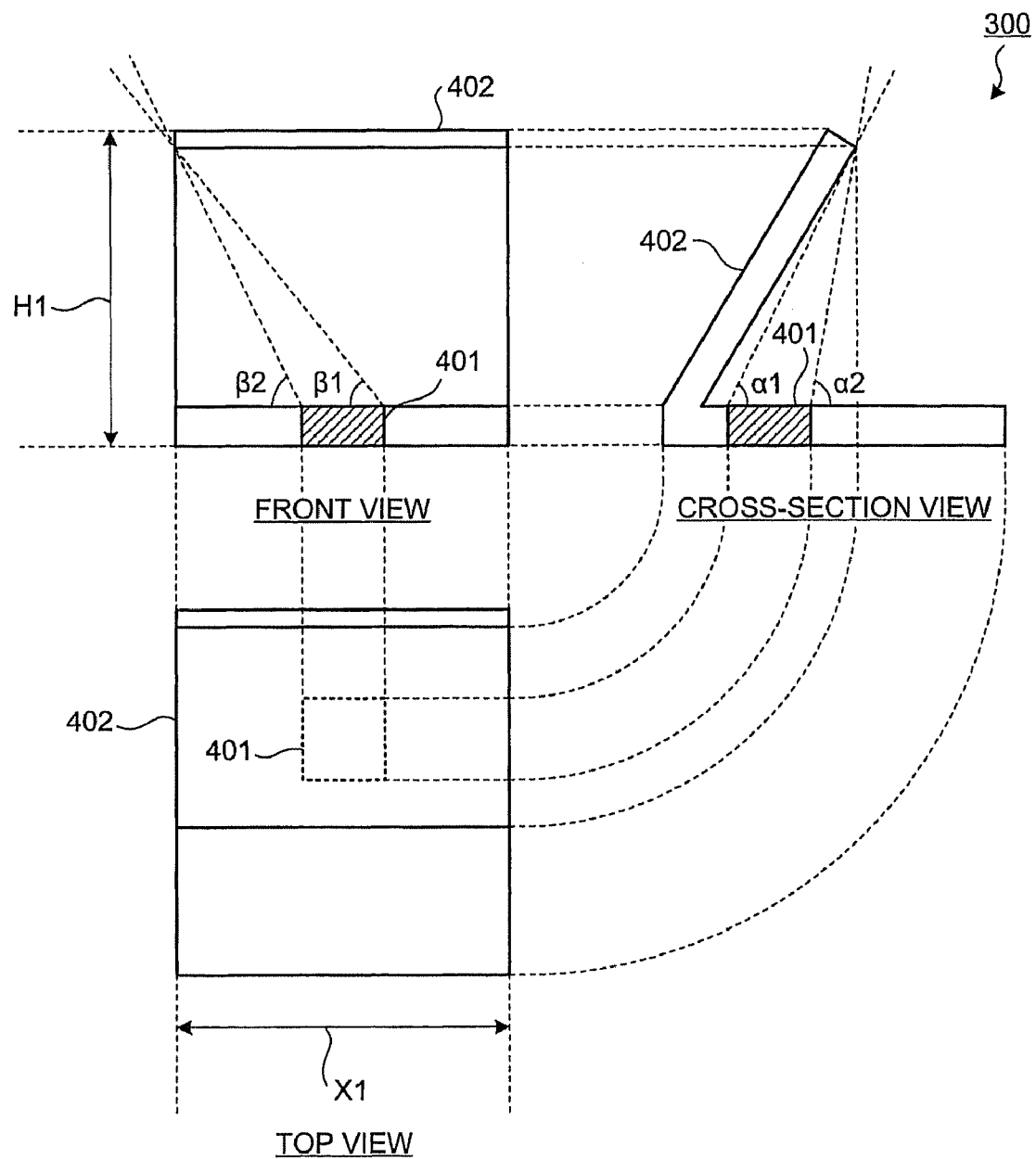
FIG. 4 is an explanatory diagram of an optical receiving apparatus according to the first embodiment.

FIG. 4 is an explanatory diagram of the optical receiving apparatus according to the first embodiment.

As depicted in FIG. 4, the optical receiving apparatus 300 is made up of a receiving unit 401 and a blocking plate 402. The receiving unit 401 receives the optical signal 310 transmitted from the transmitting unit 301 depicted in FIG. 3 and is disposed inside the blocking plate 402 having a height H1 and a width X1.

Although details will be described with reference to FIGS. 5A and 5B, the optical receiving apparatus 300, via the blocking plate 402, blocks the optical signal 310 when the angle of incidence is a predetermined angle or greater, thereby terminating the reception of the optical signal 310 by the receiving unit 401. The incident angle is, for example, an angle of the optical signal 310 relative to the disposition surface of the receiving unit 401 and if the disposition surface is parallel to the optical receiving surface, the incident angle may be an angle of the optical signal 310 relative to the optical receiving surface.

Specifically, for example with respect to a front view, the blocking of the optical signal 310 is performed by partially blocking the optical signal 310 when the incident angle is equal to or greater than β1 and less than β2 and completely blocking the optical signal 310 when the incident angle is equal to or greater than β2. With respect to a cross-sectional view, the optical signal 310 is partially blocked when the incident angle is equal to or greater than α1 and less than α2 and the optical signal 310 is completely blocked when the incident angle is equal to or greater than α2.

Although, in the description with respect to FIG. 4, configuration is such that the optical signal 310 is blocked by the blocking plate 402, the shape of the blocking plate 402 is not limited hereto and configuration may be such that the optical signal 310 received by the receiving unit 401 is blocked according to a predetermined incident angle. The blocking plate may be provided on the incoming optical path of the optical signal 310 to the receiving unit 401 such that the optical signal 310 received by the receiving unit 401 is blocked according to the predetermined incident angle.

The blocking plate 402 is configured to be provided on the outgoing optical path of the optical signal 310 from the transmitting unit 301. The position at which blocking of the optical signal 310 begins is determined by an angle α ($α1 \leq α \leq α2$) between the blocking plate 402 and the disposition surface of the receiving unit 401. The height H1 determines the position at which the optical signal 310 is completely blocked. The width X1 determines the degree of displacement causing the blocking of the optical signal with regard to the displacement of the blocking plate 402 (the vehicle equipped with the blocking plate 402) along the lane width direction.

It is needless to say that the position at which the optical signal 310 is completely blocked is also determined by the length of the blocking plate 402 together with the height H1. Even when the height H1 is the same, if the length of the blocking plate 402 is increased (projected forward (to the right in the cross-section view of FIG. 4)), complete blocking occurs sooner.

FIG. 5A is an explanatory diagram of a cross section of the blocking of the optical signal by the receiving unit according to the first embodiment.

In FIG. 5A, although the optical receiving apparatus 300 is included in an on-vehicle device that is equipped on the vehicle 102 depicted in FIG. 3 and is configured to output the received optical signal 310 to the on-vehicle device, the optical receiving apparatus 300 will be described without depicting the vehicle 102 in FIG. 5A.

The optical receiving apparatus 300 receives the optical signal 310 in the signal receiving area 330 within the communicable area 320. Specifically, for example, the optical receiving apparatus 300 receives the light via the receiving unit 401 since the blocking plate 402 does not block the optical signal 310 because the incident angle of the optical signal 310 is less than α1 in the signal receiving area 330.

The optical receiving apparatus 300 partially blocks the optical signal 310 in the blocking area 340 within the communicable area 320. Specifically, for example, if the incident angle of the optical signal 310 is equal to or greater than α1 and less than α2 in the blocking area 340, the optical receiving apparatus 300 partially blocks the optical signal 310 with the blocking plate 402 and partially receives the optical signal 310 with the receiving unit 401.

Since the blocking area 340 is an area where the optical signal 310 is strong, the area on the optical receiving surface where reception of the optical signal 310 is obstructed by the blocking plate 402 definitely varies according to the movement of the optical receiving apparatus 300. Therefore, the position of the optical receiving apparatus 300 (the vehicle equipped with the optical receiving apparatus 300) may be calculated dynamically by using a photo receiving element to capture temporal changes of the obstructed area (or an area receiving the optical signal 310) on the receiving unit 401.

The optical receiving apparatus 300 completely blocks the optical signal 310 when exiting the blocking area 340 of the communicable area 320. Specifically, for example, if the incident angle of the optical signal 310 is equal to or greater than α2 in the blocking area 340, the optical receiving apparatus 300 blocks the optical signal 310 with the blocking plate 402 and does not receive the optical signal 310 with the receiving unit 401.

As described, the position where the blocking of the optical signal 310 begins and the position where complete blocking occurs may be set by the incident angles α1 and α2 and the height H1, for example. Specifically, for example, the incident angles α1 and α2 may be set based on a height Hb from a road surface 2000 to the transmitting unit 301, a height Ha from the road surface 2000 to the receiving unit 401, and distances Xa, Xb, and Xc between a perpendicular line P from the transmitting unit 301 to the road surface 2000 and the receiving unit 401. More specifically, for example, the incident angles α1 and α2 may be determined such that complete blocking occurs directly below the transmitting unit 301 where the effects of the surrounding environment are less pronounced. The incident angles α1 and α2 may also be set based on a height Hc from the transmitting unit 301 to the receiving unit 401 and the distances Xa, Xb, and Xc between the perpendicular line P from the transmitting unit 301 to the road surface 2000 and the receiving unit 401.

The optical receiving apparatus 300 is equipped with the blocking plate 402 such that a leading end of the blocking plate 402 is positioned so that a line connecting the transmitting unit 301 and the leading end of the blocking plate 402 (the upper edge of the blocking plate 402 depicted in FIG. 4), i.e., an unobstructed path of the optical signal 310 passing the leading end of the blocking plate 402, passes the upper portion of the receiving unit 401 while the receiving unit 401 is within a predetermined region (the blocking area 340) of the communicable area 320 of the optical beacon.

If the optical receiving apparatus 300 is disposed on a dashboard of the vehicle 102, the incident angles α1 and α2 and the height H1 may be set to reduce the size of the optical receiving apparatus 300 according to the boundary position of the communication area assuring minimal communication defined by the specifications of the roadside device 101 so as not to obstruct the view of the driver. Specifically, for example, although the height H1 may be set higher to increase the accuracy of the optical signal 310 via narrower ranges of the incident angles α1 and α2, the height is desirably set to the extent that the view of the driver is not obstructed.

The optical receiving apparatus 300, via the blocking plate 402 having the incident angles α1 and α2 and the height H1, blocks the optical signal 310 received by the receiving unit 401 to arbitrarily set the boundary position where the reception of the optical signal 310 is ends. Assuming the traveling direction and the width direction are denoted by X and Y, respectively, the optical receiving apparatus 300 may be represented as an optical receiving apparatus having a blocking plate that blocks the light of the X-component. By defining the set boundary position as the reference position for the autonomous positioning, the position of the vehicle 120 may be determined accurately within the advanced safety service area 110.

Although the incident angles α1 and α2 are used in the description with respect to FIG. 5A, the same description may be made with respect to outgoing angles (90−α1) and (90−α2). Specifically, for example, the optical receiving apparatus 300 receives the optical signal in the communicable area 320 when the outgoing angle of the optical signal 310 relative to the perpendicular line from the transmitting unit 301 to the road surface is smaller than (90−α1). The optical receiving apparatus 300 partially receives the optical signal 310 when the outgoing angle is greater than the (90−α2) and equal to or less than (90−α1) and the optical receiving apparatus 300 does not receive the optical signal 310 when the outgoing angle is equal to or less than (90−α2).

FIG. 5B is a front view of the blocking of the optical signal by the receiving unit according to the first embodiment. FIG. 5B is a front view of the blocking area 340 depicted in FIG. 5A and, although the optical receiving apparatus 300 is equipped on the on-vehicle device equipped on the vehicle 102 depicted in FIG. 3 and is configured to output the received optical signal 310 to the on-vehicle device, the optical receiving apparatus 300 will be described without depicting the vehicle 102 in FIG. 5B.

As depicted in FIG. 5A, the optical receiving apparatus 300 is configured to partially block the optical signal 310 while in the blocking area 340 and completely block the optical signal 310 when exciting the blocking area 340. The boundary position is arbitrarily set by completely blocking the optical signal 310 and the set boundary position is used for the accurate position location.

In FIG. 5B, although the blocking plate 402 may completely block the optical signal 310 if the incident angle of the optical signal 310 is equal to or greater than β2 in the lane width direction in the blocking area 340, the blocking plate 402 partially blocks the optical signal 310 if the incident angle is equal to or greater than β1 and less than β2 and the optical signal 310 is entirely received if the incident angle is less than β1. In other words, even in the blocking area, if the position of the optical receiving apparatus 300 is displaced along the lane width direction, the optical signal 310 is received in a lateral direction or an oblique direction as viewed from the front side and the boundary position is determined inaccurately.

The height H1 and the width X1 are set such that the blocking plate 402 completely blocks the optical signal 310 when exiting from the blocking area 340. Specifically, for example, since the roadside devices 101 that include the transmitting unit 301 are disposed one for each lane, the height H1 and the width X1 are set such that the optical signal 310 is completely blocked at the position of exit from the blocking area 340 with respect to the vehicle equipped with the optical receiving apparatus 300 and traveling in one lane.

The optical receiving apparatus 300 is equipped with the blocking plate 402 such that the leading end of the blocking plate 402 is positioned so that a line connecting the transmitting unit 301 and the leading end of the blocking plate 402 (the side edge of the blocking plate 402 depicted in FIG. 4), i.e., an unobstructed path of the optical signal 310 passing through the leading end of the blocking plate 402, passes the upper portion of the receiving unit 401 while the receiving unit 401 is within a predetermined region (the blocking area 340) of the communicable area 320 of the optical beacon.

Figure 6:
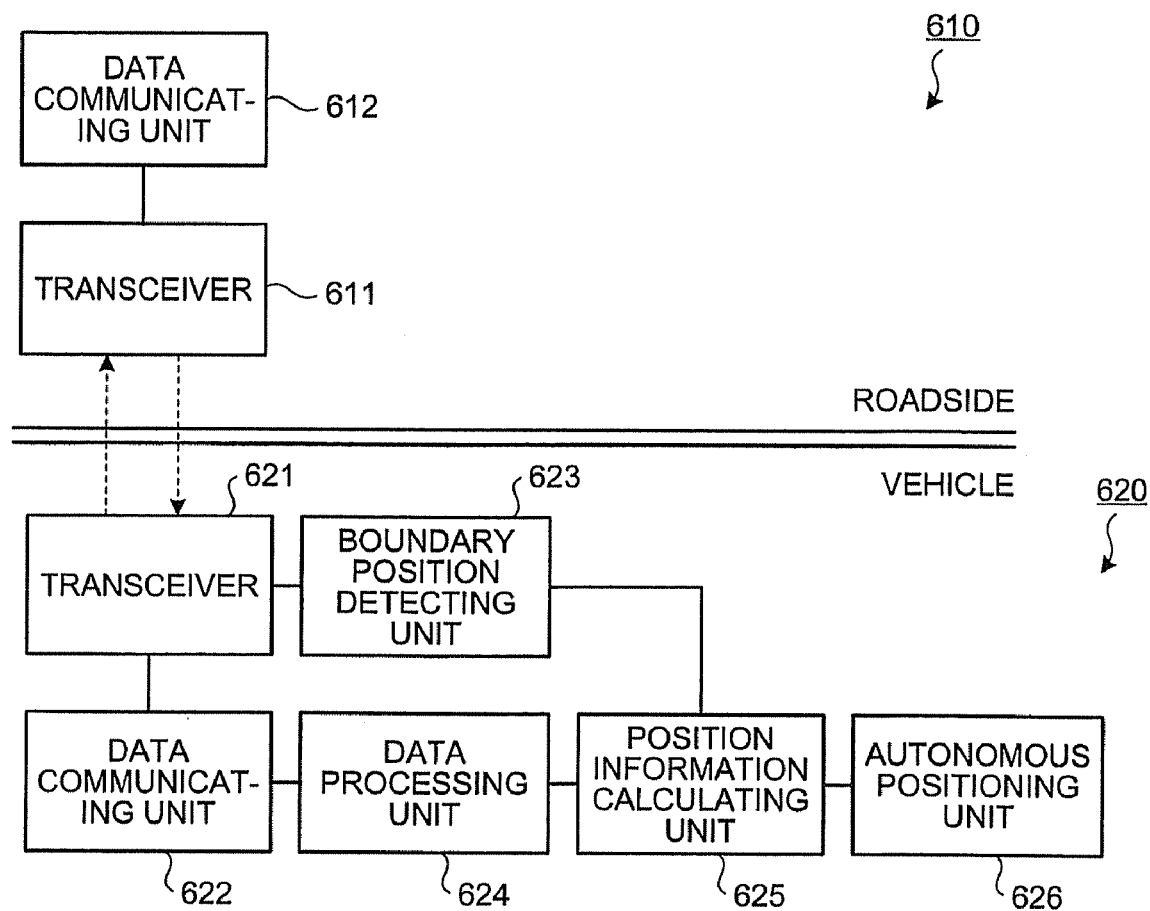
FIG. 6 is a block diagram of a functional configuration of the position locating system according to the first embodiment.

FIG. 6 is a block diagram of a functional configuration of the position locating system according to the first embodiment.

As depicted in FIG. 6, the position locating system (e.g., the position locating system 100 depicted in FIG. 1) is made up of an optical beacon 610 disposed on the roadside and a navigation apparatus 620 equipped on a vehicle. The optical beacon 610 may be the roadside device 101 depicted in FIG. 1 and is made up of an optical transceiver 611 and a data communicating unit 612.

The optical transceiver 611, under the control of the data communicating unit 612, transmits and receives optical signals with respect to the navigation apparatus 620 equipped on a vehicle entering the communicable area of the optical beacon 610.

Specifically, for example, the optical signals include the DL signal, which is transmitted to the navigation apparatus 620 and include the position information and the ID information of the optical beacon 610 and road traffic information, and the UL signal, which is transmitted from the navigation apparatus 620 and include the identification information of the vehicle equipped with the navigation apparatus 620. More specifically, for example, when transmitting the DL signal, the optical transceiver 611 implements a function of the transmitting unit 301 depicted in FIG. 3.

The data communicating unit 612 controls the optical transceiver 611 to transmit and receive the optical signals with respect to the navigation apparatus 620 equipped on a vehicle entering the communicable area 320 of the optical beacon 610.

The navigation apparatus 620 is equipped on the vehicle 102 depicted in FIG. 1, for example, and is made up of an optical transceiver 621, a data communicating unit 622, a boundary position detecting unit 623, a data processing unit 624, a position information calculating unit 625, and an autonomous positioning unit 626.

The optical transceiver 621 transmits and receives the optical signals 310 with respect to the optical beacon 610 when the vehicle equipped with the navigation apparatus 620 enters the communicable area 320 of the optical beacon 610.

Specifically, for example, the optical signals are the DL signal transmitted from the optical beacon 610 including the position information and the ID information of the optical beacon 610 and the road traffic information, and the UL signal transmitted to the optical beacon 610 including the identification information of the vehicle equipped with the navigation apparatus 620. More specifically, for example, when receiving the DL signal, the optical transceiver 621 implements the function of the optical receiving apparatus 300 depicted in FIG. 3.

The data communicating unit 622 controls the optical transceiver 621 to transmit and receive the optical signals with respect to the optical beacon 610 when the vehicle equipped with the navigation apparatus 620 enters the communicable area 320 of the optical beacon 610.

The boundary position detecting unit 623 detects the boundary position of the optical signals used in the communication with the optical beacon 610. The boundary position is, for example, a position where reception of the DL signal transmitted from the optical beacon 610 begins or a position where the reception ends. The boundary position may be a position where transmission of the UL signal transmitted to the optical beacon 610 begins or a position where the transmission is ended.

In the first embodiment, the detection of the boundary position is performed by detecting a position where the DL signal is completely blocked by the optical receiving apparatus 300 depicted in FIG. 3, for example. The boundary position is precisely detected by a falling edge of a signal when the DL signal is completely blocked.

The data processing unit 624 processes data received by the data communicating unit 622. Specifically, for example, the data processing unit 624 processes the position and the ID information of the optical beacon 610 and the road traffic information.

The position information calculating unit 625 uses the boundary position detected by the boundary position detecting unit 623 and the position of the optical beacon 610 processed by the data processing unit 624 to calculate a reference position as a reference for the autonomous positioning by the autonomous positioning unit 626 described later. Specifically, for example, when the position information concerning the position of the optical beacon 610 is acquired, the position information calculating unit 625 may calculate the boundary position from the specifications of the optical beacon 610 and the shape of the optical receiving apparatus 300.

The autonomous positioning unit 626, using the reference position calculated by the position information calculating unit 625, performs autonomous positioning to locate the current position of the vehicle. Specifically, for example, in the position location through the autonomous positioning, a distance from the reference position is calculated by performing time-series management using vehicle speed pulses, autonomous positioning sensors such as an acceleration sensor and a gyroscope, and a vehicle velocity vector acquired from the autonomous positioning sensors as the positioning information.

Figure 7:
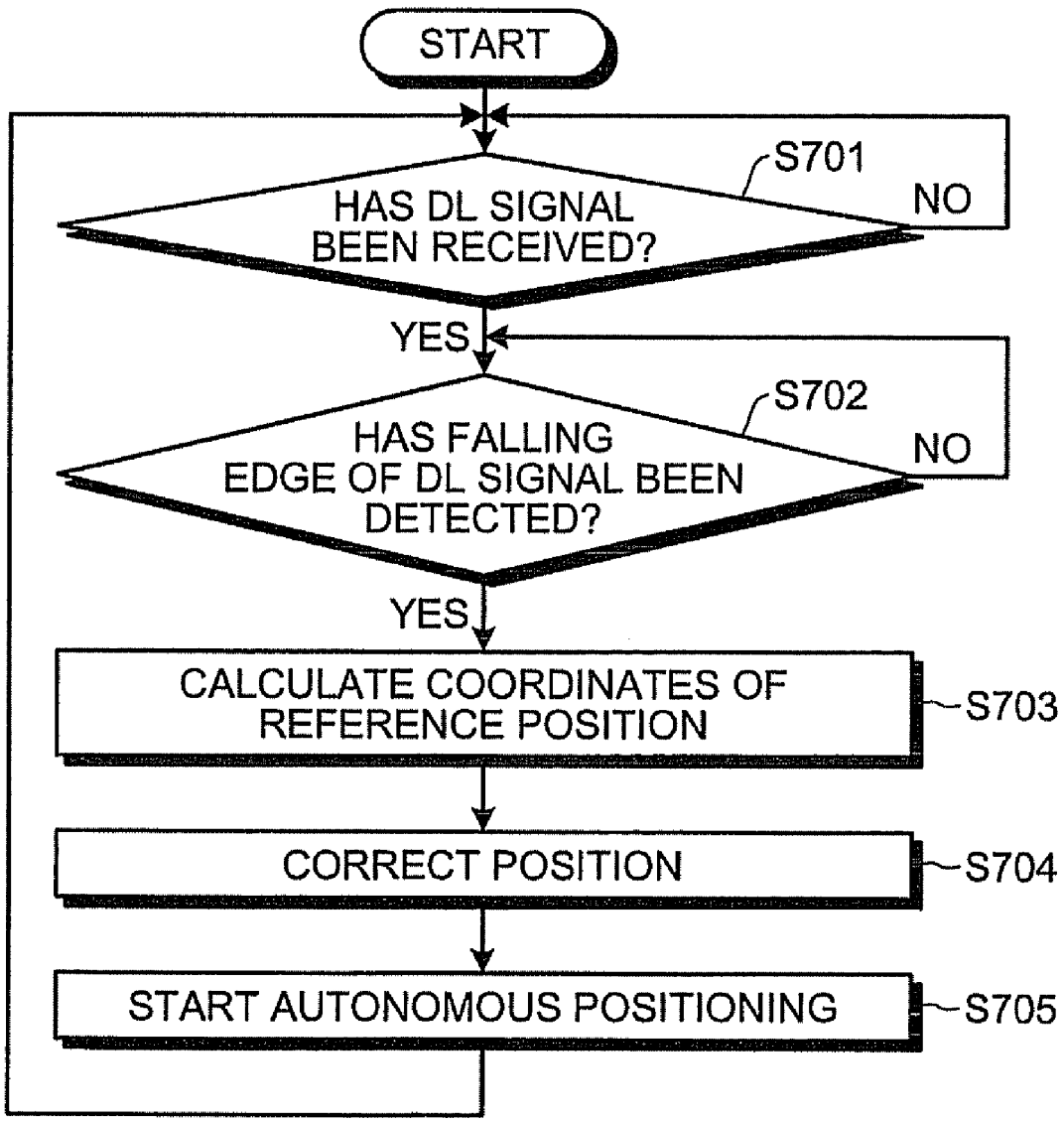
FIG. 7 is a flowchart of processing executed by a navigation apparatus according to the first embodiment.

FIG. 7 is a flowchart of processing executed by the navigation apparatus according to the first embodiment.

As depicted in FIG. 7, it is determined whether the optical transceiver 621 has received the DL signal from the optical beacon 610 (step S701). Reception of the DL signal is waited for at step S701 (step 701: NO), when the DL signal is received (step S701: YES), it is determined whether the boundary position detecting unit 623 has detected the falling edge of the DL signal (step S702). Specifically, for example, the falling edge of the DL signal is detected since the DL signal is completely blocked by the optical receiving apparatus 300 depicted in FIG. 3.

Detection of the falling edge of the DL signal is waited for at step S702 (step 702: NO), when the falling edge is detected (step S702: YES), the position information calculating unit 625 calculates coordinates of a reference position (step S703). The reference position is, for example, a position serving as a reference for the autonomous positioning and is calculated using the boundary position identified from the falling edge of the DL signal detected at step S702 and the position of the optical beacon 610 included in the DL signal received at step S701.

The autonomous positioning unit 626 corrects the position using the reference position calculated at step S703 (step S704) and commences autonomous positioning from the reference position (step S704). The process is repeated by returning to step S701. Although not described in the flowchart depicted in FIG. 7, the processing depicted in FIG. 7 may be repeated until the vehicle stops traveling.

FIG. 8 is an explanatory diagram of an example of a reference position setting result according to the first embodiment.

In FIG. 8, a table of the reference position setting result indicates errors in the setting of the reference position according to traveling position of the vehicle 102 equipped with the optical receiving apparatus 300 along the vehicle width direction, vehicle heights (installation height of the optical receiving apparatus 300 from the road surface), and vehicle speed.

The reference position is set with an error less than 0.5 m as indicated in the table 800 and hence, errors in the position location of the vehicle 102 occurring with the autonomous positioning fall within a range (e.g., about 2.5 m) that does not cause a driver misperceive the positional relationship between the vehicle of the driver and other vehicles in the advanced safety service area 110 depicted in FIG. 1, for example.

As described above, according to the first embodiment, since the reference position serving as a reference for the autonomous positioning is set with high accuracy using the boundary position identified from the position of the roadside device, error in the position location of the vehicle is reduced and the reliability of the position location is improved. Specifically, error in the position location may be brought within a half-length of a vehicle (e.g., about 2.5 m) in an area provided with the advanced safety service (e.g., a traveling range within about 100 m), and the provision of an appropriate advanced safety service may be received.

According to the first embodiment, since existing infrastructures such as optical beacons are effectively utilized to perform the position location of the vehicle, no burden is imposed for disposing new infrastructures. Additionally, a mere installation of the blocking plate on the receiving unit enables accurate position location to be implemented simply and with lower costs. The accuracy of boundary position and of the settings of the reference position may be adjusted by the width and the height of the blocking plate and the incident angle (outgoing angle) of the optical signal, and further the convenience of the position location of the vehicle may be improved.

Since the boundary position may be detected by receiving and blocking the optical signal at a point where the optical signal from the roadside device may be received with certainty, the reference position may be set with certainty and precision, without being affected by weather and traveling conditions.

In the first embodiment, description has been made of an example in which the optical signal 310 is completely blocked by the blocking plate having the height H1 and the width X1 depicted in FIG. 5B at the position of exit from the blocking area 340 of a vehicle traveling in one lane. According to a second embodiment, description will be made of an example in which the vehicle position along the lane width direction is detected using a rate at which the optical signal 310 is received along the lane width direction in the communicable area 320 depicted in FIG. 3.

Schematics of a position locating system according to the second embodiment, a vehicle entering the advanced safety area, the initial value setting, and an optical receiving apparatus are substantially identical to those depicted in FIG. 1, FIG. 2, FIG. 3, and FIG. 4, respectively, and will not be described.

Figure 9:
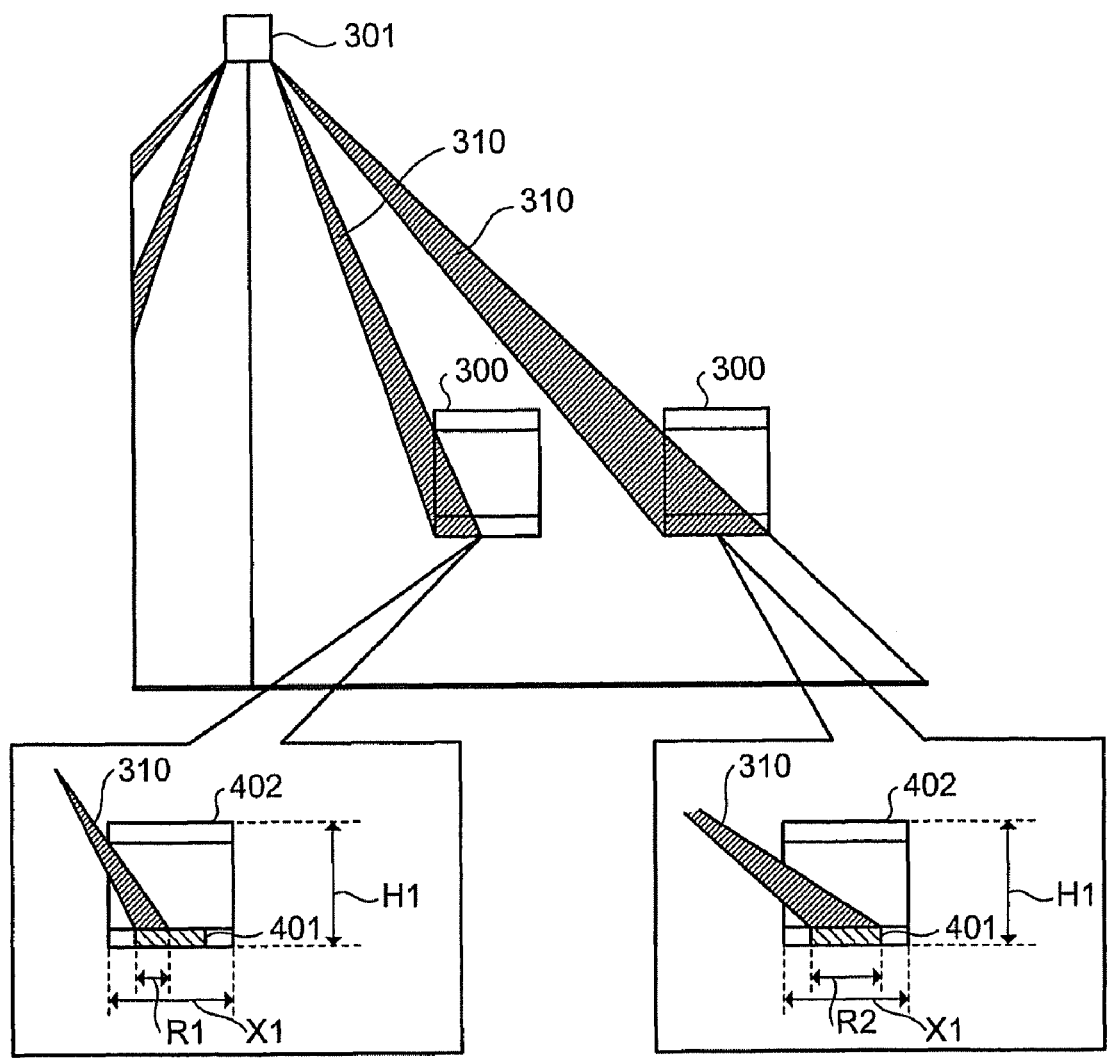
FIG. 9 is an explanatory diagram of the blocking of the optical signal by the receiving unit as viewed from the front and according to a second embodiment.

FIG. 9 is an explanatory diagram of the blocking of the optical signal by the receiving unit as viewed from the front and according to the second embodiment.

As depicted in FIG. 9, the optical receiving apparatus 300 is configured to be able to detect a signal receiving area in which the optical signal 310 is received on the optical receiving surface of the receiving unit 401 and detects the vehicle position along the lane width direction using the signal receiving area. Assuming the traveling direction and the width direction are denoted by X and Y, respectively, the optical receiving apparatus 300 may be represented as an optical receiving apparatus having a blocking plate that blocks the light of the Y-component. Specifically, for example, the light receiving range in which the optical signal 310 is received may be detected by disposing plural photo receiving elements on the optical receiving surface and identifying the photo receiving elements receiving the optical signal 310 and the photo receiving elements not receiving the optical signal 310.

More specifically, for example, FIG. 9 depicts an example in which the optical signal 310 is received within a signal receiving area of R1 on the optical receiving surface and an example in which the optical signal 310 is received within a signal receiving area of R2 on the optical receiving surface. If the light receiving range is R2, the incident angle of the optical signal 310 is sufficiently small and the vehicle position along the vehicle width direction is distant from the transmitting unit 301. If the light receiving range is R1, the incident angle of the optical signal 310 is large and the vehicle position in the vehicle width direction is close to the transmitting unit 301 since the optical signal 310 is partially blocked.

As described, the vehicle position along the lane width direction is detected by utilizing the concept that the optical receiving apparatus 300 has a larger light receiving range on the optical receiving surface as the distance to the transmitting unit increases along the lane width direction and has a smaller light receiving range on the optical receiving surface as the distance decreases along the lane width direction.

Although, in the description of FIG. 9, the vehicle position along the lane width direction is detected using a light receiving range in which the optical signal 310 is received, the vehicle position along the lane width direction may be detected using the strength of the optical signal 310.

Although, in the description of FIG. 9, the vehicle position along the lane width direction is detected using a light receiving range of the optical signal 310 relative to the optical receiving surface, the vehicle position along the lane width direction may be detected by plural optical receiving apparatuses 300.

Specifically, for example, the optical receiving apparatuses 300 may accurately detect the vehicle position on the right or left side of the transmitting unit 301 using an optical receiving apparatus 300 capable of receiving the optical signal 310 when located on the right side of the transmitting unit 301 along the lane width direction and incapable of receiving the optical signal 310 when located on the left side and an optical receiving apparatus 300 capable of receiving the optical signal 310 when located on the left side of the transmitting unit 301 along the lane width direction and incapable of receiving the optical signal 310 when located on the right side while the vehicle travels in the communicable area 320.

The area in which the optical signal 310 is blocked by the blocking plate 402 is a range closer to the transmitting unit 301 and where the strength of the optical signal 310 is high. Therefore, the detection of a change in an area on the optical receiving surface may be detected clearly in terms of the signal receiving area (obstructed area) of the light blocked by the blocking plate 402 and a change in the amount of light on the optical receiving surface in terms of the light amount. Therefore, the position of the optical receiving apparatus 300 (the vehicle equipped with the optical receiving apparatus 300) may be calculated dynamically by using a photo receiving element to capture temporal changes in the amount of light in a light receiving range (shadow range) or the amount of light on the optical receiving surface.

As described, according to the second embodiment, the setting of the reference position may be made more accurate by detecting the vehicle position along the vehicle lane direction. The reference position may be set with high accuracy by using the second embodiment along with the first embodiment, and error in the position location of the vehicle may be reduced and the reliability of the position location may be improved.

Although the first embodiment is configured to block the optical signal 310 by the optical receiving apparatus 300 depicted in FIG. 4, an optical receiving apparatus having a configuration different from that depicted in FIG. 4 will be described in a third embodiment.

Schematics of a position locating system according to the third embodiment, a vehicle entering the advanced safety area, and the initial value setting are substantially identical to those depicted in FIG. 1, FIG. 2, and FIG. 3, respectively, and will not be described.

Figure 10:
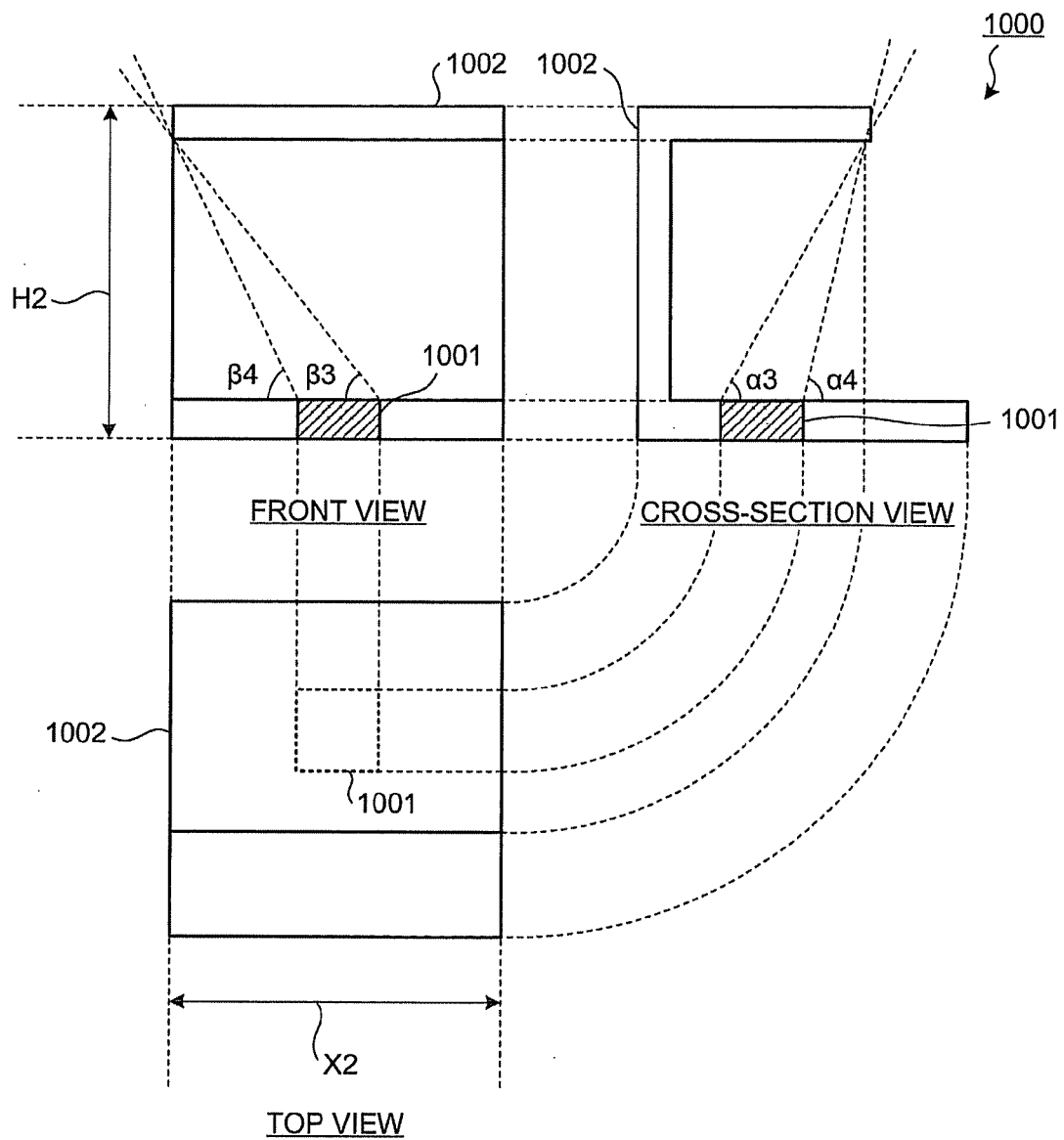
FIG. 10 is an explanatory diagram of an optical receiving apparatus according to a third embodiment.

FIG. 10 is an explanatory diagram of the optical receiving apparatus according to the third embodiment.

As depicted in FIG. 10, the optical receiving apparatus 1000 is made up of a receiving unit 1001 and a blocking plate 1002. The receiving unit 1001 receives the optical signal 310 transmitted from the transmitting unit 301 depicted in FIG. 3 and is disposed inside the blocking plate 1002 having a height H2 and a width X2.

The optical receiving apparatus 1000, via the blocking plate 1002, blocks the optical signal 310 when the angle of incidence is a predetermined angle or greater, thereby terminating the reception of the optical signal 310 by the receiving unit 1001. The incident angle is, for example, an angle of the optical signal 310 relative to the disposition surface of the receiving unit 1001 and if the disposition surface is parallel to the optical receiving surface, the incident angle may be an angle of the optical signal 310 relative to the optical receiving surface.

Specifically, for example with respect to a front view, the blocking of the optical signal 310 is performed by partially blocking the optical signal 310 when the incident angle is equal to or greater than $\beta3$ and less than $\beta4$ and completely blocking the optical signal 310 when the incident angle is equal to or greater than $\beta4$. With respect to a cross-sectional view, the optical signal 310 is partially blocked when the incident angle is equal to or greater than $\alpha3$ and less than $\alpha4$ and the optical signal 310 is completely blocked when the incident angle is equal to or greater than $\alpha4$.

Although, in the description with respect to FIG. 10, configuration is such that the optical signal 310 is blocked by the blocking plate 1002, the shape of the blocking plate 1002 is not limited hereto and configuration may be such that the optical signal 310 received by the receiving unit 1001 is blocked according to a predetermined incident angle. The blocking plate may be provided on the incoming optical path of the optical signal 310 to the receiving unit 1001 such that the optical signal 310 received by the receiving unit 1001 is blocked according to the predetermined incident angle. In other words, the blocking plate 1002 is configured to be provided on the outgoing optical path of the optical signal 310 from the transmitting unit 301.

As described, according to the third embodiment, since the reference position serving as a reference for the autonomous positioning may be set with high accuracy even with a blocking plate having a shape different from that depicted in the first embodiment, error in the position location of the vehicle may be reduced and the reliability of the position location may be improved. Since the shape of the blocking plate may be changed depending on circumstances of the installation location in the vehicle and application, the configuration according to the third embodiment may be utilized for a wide variety of purposes.

Although the first and third embodiments are configured to receive the optical signal 310 using the optical receiving apparatus (300, 1000) having the receiving unit 401 parallel to the disposition surface of the receiving unit 401 configured as depicted in FIGS. 4 and 10, an optical receiving apparatus having a shape different from that depicted in FIGS. 4 and 10 will be described in a fourth embodiment.

Schematics of a position locating system according to the fourth embodiment, a vehicle entering the advanced safety area, and the initial value setting are substantially identical to those depicted in FIG. 1, FIG. 2, and FIG. 3, respectively, and will not be described.

Figure 11:
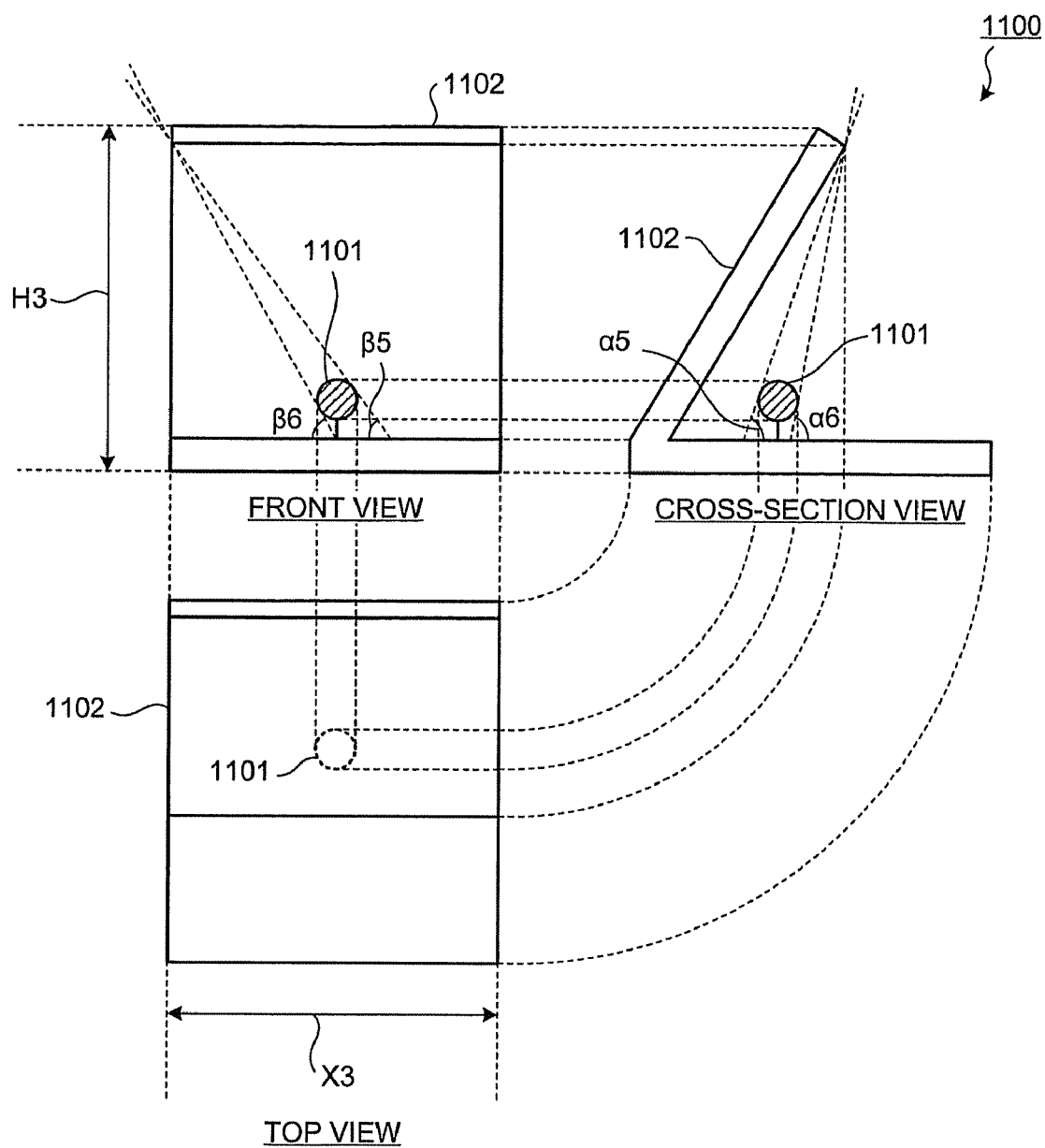
FIG. 11 is an explanatory diagram of an optical receiving apparatus according to the fourth embodiment.

FIG. 11 is an explanatory diagram of the optical receiving apparatus according to the fourth embodiment.

As depicted in FIG. 11, the optical receiving apparatus 1100 is made up of a receiving unit 1101 and a blocking plate 1102. The receiving unit 1101 receives the optical signal 310 transmitted from the transmitting unit 301 depicted in FIG. 3 and is disposed inside the blocking plate 1102 having a height H3 and a width X3.

The optical receiving apparatus 1100, via the blocking plate 1102, blocks the optical signal 310 when the angle of incidence is a predetermined angle or greater, thereby terminating the reception of the optical signal 310 by the receiving unit 1101. The incident angle is, for example, an angle of the optical signal 310 relative to the disposition surface of the receiving unit 1101.

Specifically, for example with respect to a front view, the blocking of the optical signal 310 is performed by partially blocking the optical signal 310 when the incident angle is equal to or greater than $\beta5$ and less than $\beta6$ and completely blocking the optical signal 310 when the incident angle is equal to or greater than $\beta6$. With respect to a cross-sectional view, the optical signal 310 is partially blocked when the incident angle is equal to or greater than $\alpha5$ and less than $\alpha6$ and the optical signal 310 is completely blocked when the incident angle is equal to or greater than $\alpha6$.

Although, in the description with respect to FIG. 11, configuration is such that the optical signal 310 is blocked by the blocking plate 1102, the shape of the blocking plate 1102 is not limited hereto and configuration may be such that the optical signal 310 received by the receiving unit 1101 is blocked according to a predetermined incident angle. The blocking plate may be provided on the incoming optical path of the optical signal 310 to the receiving unit 1101 such that the optical signal 310 received by the receiving unit 1101 is blocked according to the predetermined incident angle. In other words, the blocking plate 1102 is configured to be provided on the outgoing optical path of the optical signal 310 from the transmitting unit 301.

As described, according to the fourth embodiment, since the reference position serving as a reference for the autonomous positioning may be set with high accuracy using the receiving unit having a shape different from those depicted in the first to third embodiments, error in the position location of the vehicle may be reduced and the reliability of the position location may be improved. Since the shape of the receiving unit may be changed depending on circumstances of the installation location in the vehicle, application, and performance of photo receiving elements, the configuration according to the fourth embodiment may be utilized for a wide variety of purposes.

According to a fifth embodiment, specifically, an intersection service system is a system that, for example, at an intersection, provides to each vehicle passing through the intersection, services useful to the vehicles. The intersection service system may provide a service to a vehicle traveling at an arbitrary point on a road as well as at an intersection.

Specifically, for example, the system provides information useful for a vehicle to safely and comfortably cross an intersection, such as a service of providing relevant road traffic information in advance, a service of providing an image of a blind spot for a driver when turning right or left at an intersection, and a service of indicating the timing at which a signal changes at an intersection.

Figure 12:
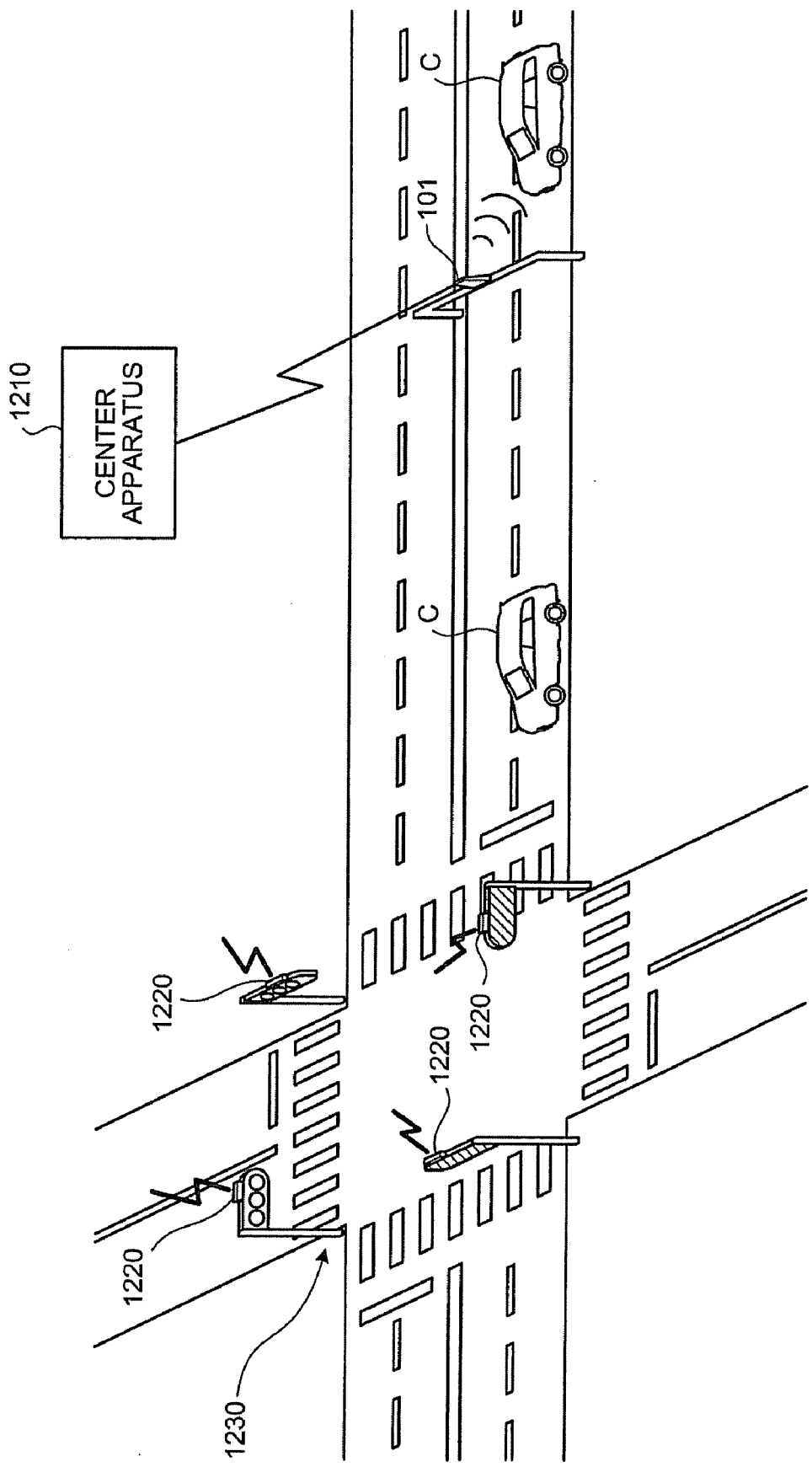
FIG. 12 is an explanatory diagram of a system configuration of an intersection service system according to a fifth embodiment.

FIG. 12 is an explanatory diagram of a system configuration of the intersection service system according to the fifth embodiment. As depicted in FIG. 12, the intersection service (traveling support) system includes a center apparatus 1210, cameras 1220, a vehicle system (see FIG. 15 described hereinafter), and the roadside device (communication device) 101. In the fifth embodiment, the roadside device 101 will hereinafter be described as an optical beacon 101.

The center apparatus 1210 is a computer apparatus that includes a storage device storing various types of information and a communication device that communicates with external apparatuses. The storage device stores various types of traffic information used in the provision of services, for example. The traffic information is information used in the provision of the services above.

Specifically, the traffic information is, for example, image information representative of conditions near an intersection (e.g., a portion of a blind spot of a driver), graphical information representative of a configuration of an intersection, text information reporting past accident histories, audio information promoting awareness to prevent accidents. The traffic information may be, for example, a program for displaying image information on a display in a vehicle and a program for activating the cameras 1220 capturing an image to be displayed.

The traffic information exists for each intersection. For example, the traffic information exists for one intersection, such as traffic information correlated with a center position of the intersection, traffic information correlated with a position of entry into the intersection for a vehicle traveling straight ahead, and traffic information correlated with a position of entry into the intersection for a vehicle in a right turn lane.

Specifically, the center apparatus 1210 communicates with the cameras 1220 making up the intersection service system, a service providing apparatus, the optical beacon 101, etc. Since the computer apparatus implementing the center apparatus 1210 is identical to widely utilized computer apparatuses, the configuration and the function thereof will not be described.

The cameras 1220 capture images of an intersection 1230 or the environs of the intersection 1230. One or more of the cameras 1220 is appropriately disposed at the intersection 1230 according to the configuration of the intersection 1230, the volume of traffic at the intersection 1230, the presence or shape of buildings around the intersection 1230, etc. For example, more cameras 1220 may be disposed at a blind intersection 1230 than at an unobstructed intersection 1230 to capture images from multiple directions.

The cameras 1220 have a communication function for communicating with the center apparatus 1210 and the vehicle system and are capable of transmitting captured images to an external destination. The cameras 1220 and the communication function of the cameras 1220 are known technologies and, therefore, will not be described.

The vehicle system is equipped on the vehicle and includes an optical receiving apparatus that receives an optical signal transmitted by the optical beacon 101. The optical receiving apparatus may be any one of the optical receiving apparatuses according to the first to fourth embodiments above (see FIG. 15). The optical receiving apparatus includes a comparative receiving unit for determining the reception/blocking of the optical signal. The comparative receiving unit is not equipped with the blocking plate 402 disposed on the optical receiving apparatus 300, for example, and the optical signal sent by the optical beacon 101 is entirely incident on the comparative receiving unit.

The optical receiving apparatus determines that the optical signal incident on the optical receiving apparatus is blocked if a rate of a received light amount in the receiving unit of the optical receiving apparatus becomes equal to or smaller than a predetermined threshold relative to a received light amount in the comparative receiving unit. The vehicle system executes various programs for providing services according to the light reception state of the optical signal in the optical receiving apparatus. The vehicle system will be described in detail hereinafter.

The optical beacon 101 is disposed on a roadside such as at the side of the road and transmits optical signals that include road traffic information such as traffic congestion information, link traveling time information, regulation information, parking information, and segment traveling time information. The optical beacon 101 transmits an optical signal that includes road traffic information concerning roads closest to the position of the optical beacon 101 (e.g., a road on which the vehicle is traveling and another road connected thereto). The road traffic information is represented in a form of simple graphic or text information.

The optical beacon 101 transmits an optical signal including information representative of positions and sizes of various areas (hereinafter, "area specification information") in addition to the road traffic information. The various areas are virtual areas set at the intersection 1230 or on the road connected to the intersection 1230 (see FIG. 13). The positions and sizes of the various areas are defined by center coordinates of the various areas and the sizes of areas based on the center coordinates.

The area specification information is updated according to a change in at least one type of information including information about the environment around the intersection 1230, information about the environment of a vehicle C, and biological information concerning the driver of the vehicle C. The area specification information is updated by the administrator who manages the center apparatus 1210, for example, and the updated area specification information is transmitted to the optical beacon 101 through the center apparatus 1210. The update timing of the area specification information may be an arbitrary timing of the provider of the intersection service, for example. The update may be performed automatically when a change is made in the information that is the basis of the update.

The information about the environment around the intersection 1230 is information representative of traffic volume and the number of pedestrians, the configuration of the intersection 1230, presence of peripheral facilities (such as close to kindergarten), and the frequency of accidents. The information about the vehicle C includes values output from a gyroscope and a velocity sensor equipped on the vehicle C. The biological information concerning the driver of the vehicle C includes changes in the heart rate and the number of blinks of the driver.

Figure 13:
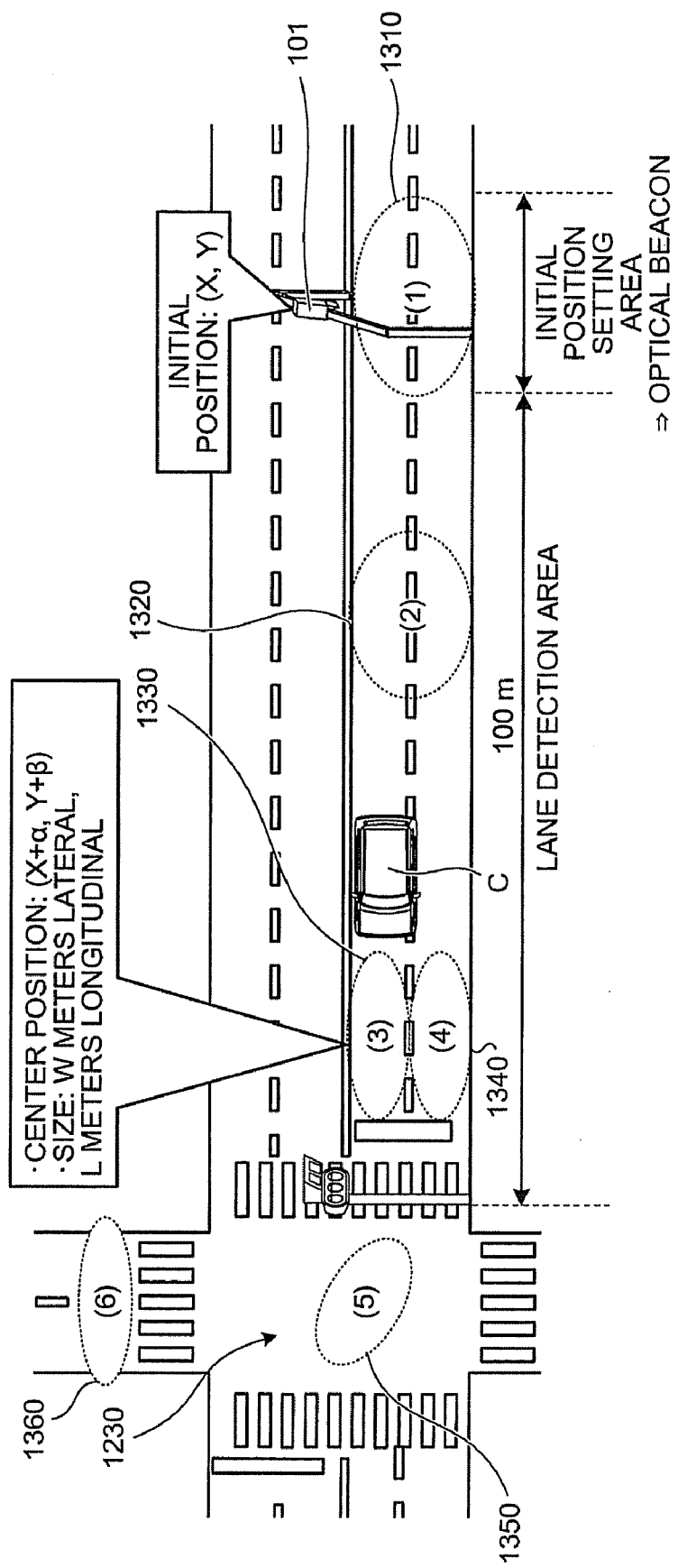
FIG. 13 is an explanatory diagram of various areas.

FIG. 13 is an explanatory diagram of the various areas. The various areas are provided for respective purposes (service contents) such as identifying the position of the vehicle C that receives the provision of the traffic information in the intersection service system and determining service contents to be provided according to the identified position of the vehicle C.

In FIG. 13, the various areas are represented as an "initial position setting (reference position locating) area" 1310, a "red signal warning area" 1320, a "right-turning vehicle service providing area" 1330, a "straight-ahead vehicle service providing area" 1340, a "blind-spot image receiving area" 1350, and an "intersection service ending area" 1360.

Among the various areas, the center coordinates of the initial position setting area 1310 are represented by position coordinates directly below the disposition of the optical beacon (hereinafter, "initial position (X, Y)" as needed). The center coordinates of other areas 1320 to 1360 are represented by coordinates relative to the initial position (X, Y). For example, the center coordinates of the right-turning vehicle service providing area 1330 are shifted from the initial position (X, Y) by values of α and β in the x-axis direction and the y-axis direction, respectively. Therefore, the center coordinates of the right-turning vehicle service providing area 1330 are represented by (X+α, Y+β).

If a direction crossing the lane and a road traveling direction are defined as a lateral direction and a longitudinal direction, respectively, the sizes of the various areas 1310 to 1360 are defined by setting lengths in the lateral direction and the longitudinal direction. For example, if the lengths in the lateral direction and the longitudinal direction are assumed to be W meters and L meters, respectively, the size is defined as a substantially rectangular area of W×L or an oval area of a comparable size.

The initial position setting (reference position locating) area 1310 is an area set as the initial position for commencing the intersection service and an area of detecting the vehicle C entering the intersection 1230 (service execution starting area). The initial position setting area 1310 is provided between the vehicle C and the intersection located ahead in the direction of travel by the vehicle C. The initial position setting area 1310 is an area similar to the initial value setting area 201 described above with respect to FIG. 2.

Other than specification by the center coordinates of the initial position setting area 1310 and the size of the area, the initial position setting area 1310 may be specified in such a way as "all the lanes within a 10-m section from a position 40 m before, to a position 50 m before the center position of the intersection", for example.

The red signal warning area 1320 is an area in which warning is given to the vehicle C indicating that a signal at the intersection 1230 is red. Specifically, when the vehicle C enters the red signal warning area 1320, a warning is initiated by providing, for example, audio or text information such as "a signal ahead is red, prepare stop".

The red signal warning area 1320 is provided between the initial position setting area 1310 and the position of the stop line of the intersection 1230. Other than specification by the center coordinates of the red signal warning area 1320 and the size of the area, the red signal warning area 1320 may be specified in such a way as "a 10-m section from a position 30 m before, to a position 40 m before the stop line position of the intersection", for example.

The right-turning vehicle service providing area 1330 is an area in which a service is provided to the vehicle C planning to turn right at the intersection 1230. Specifically, when the vehicle C enters the right-turning vehicle service providing area 1330, a program for providing a service in the blind-spot image receiving area 1350 is activated and the capturing of images in the vicinity of the intersection 1230 is initiated, for example. Other than specification by the center coordinates of the right-turning vehicle service providing area 1330 and the size of the area, the right-turning vehicle service providing area 1330 may be specified in such a way as "a 10-m section from the stop line position to a position 10 m before the stop line position of the intersection 1230", for example.

The straight-ahead vehicle service providing area 1340 is an area in which a service is provided to the vehicle C planning to proceed straight through the intersection 1230. Specifically, when the vehicle C enters the straight-ahead vehicle service providing area 1340, the provision of the road information after passing the intersection 1230 is started, for example. Other than specification by the center coordinates of the straight-ahead vehicle service providing area 1340 and the size of the area, the straight-ahead vehicle service providing area 1340 may be specified in such a way as "a 20-m section from the intersection 1230 to a position 20 m before the intersection", for example.

The blind-spot image receiving area 1350 is an area in which the provision an image of a blind-spot portion from a viewpoint of the driver of the vehicle C turning right at the intersection 1230 commences. Specifically, when the vehicle C enters the blind-spot image receiving area 1350, this causes the start of the provision of an image of the blind-spot portion to the driver of the vehicle C t and the provision of audio or text information indicative of the presence of the vehicle C, bicycles, pedestrians, etc., around the intersection 1230, for example.

The red signal warning area 1320, the right-turning vehicle service providing area 1330, the straight-ahead vehicle service providing area 1340, and the blind-spot image receiving area" 1350 are areas (service execution areas) where the services visible (audible) to the driver are provided through the vehicle system. The red signal warning area 1320, the right-turning vehicle service providing area 1330, and the straight-ahead vehicle service providing area 1340 are provided within a lane detection area.

The intersection service ending area 1360 is an area where the intersection service is terminated. Specifically, when the vehicle C enters the intersection service ending area 1360, the provision of a service available in the intersection 1230 such as the provision of information initiated in the blind-spot image receiving area 1350 is terminated, for example.

Figure 14:
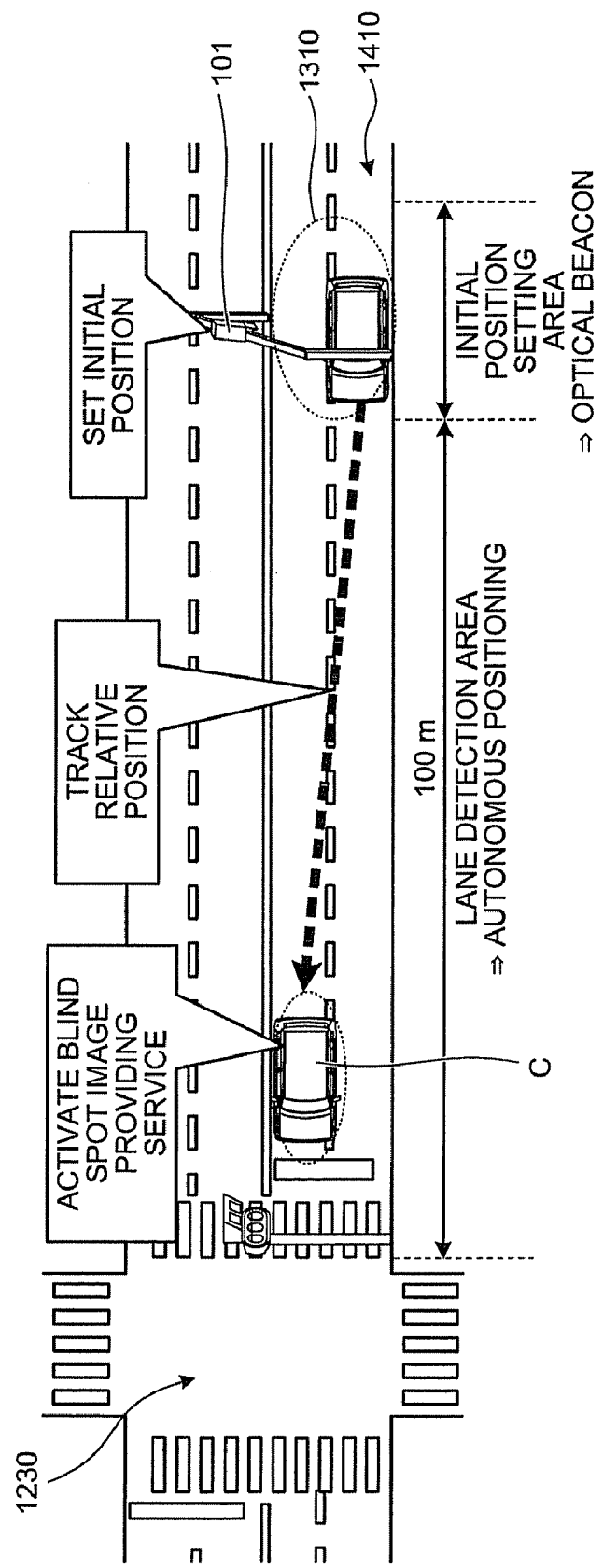
FIG. 14 is an explanatory diagram of an example of a service provided by an intersection service.

The service provided by the intersection service system will be described with a specific example. FIG. 14 is an explanatory diagram of an example of the service provided by the intersection service. FIG. 14 depicts a schematic illustration of the service provided to the vehicle C when making a right-turn. In FIG. 14, it is assumed that the vehicle C enters the intersection 1230 while moving from the right side to the left side on a road 1410, passes through the initial position setting area 1310, and then turns right at the intersection 1230 while continuously moving without stop.

When detecting that the vehicle C enters the initial position setting area 1310, the intersection service system thereafter acquires values output from the gyroscope and the velocity sensor (see FIG. 15) equipped on the vehicle C. The intersection service system performs arithmetical operations according to the autonomous positioning using the acquired output values and the initial position (X, Y) to identify a position of the vehicle C relative to the initial position (X, Y).

If it is identified that the vehicle C has moved into the right-turning vehicle service providing area 1330 as a result of the arithmetical operations using the autonomous positioning, the blind-spot image providing service is activated. When the blind-spot image providing service is activated, specifically, for example, the cameras 1220 disposed around the intersection 1230 to capture images of the environs of the intersection 1230 are activated to commence the capturing of images by the cameras 1220. Additionally, the camera 1220 capturing an image of the blind spot portion for the driver of the vehicle C is selected.

When the blind-spot image providing service is activated, a camera 1220 that will capture an image of the blind spot portion for the driver of the vehicle C is selected and only the selected camera 1220 is activated to commence the capturing of an image.

Since the vehicle C depicted in FIG. 14 plans to turn right, the vehicle C enters the blind-spot image receiving area 1350 via the right-turning vehicle service providing area 1330. When it is detected that the vehicle C has entered the blind-spot image receiving area 1350 in the intersection service, the image captured by the selected camera 1220 is displayed on a display (see FIG. 15) equipped on the vehicle C.

The values output from the gyroscope and the velocity sensor are subsequently and continuously acquired and the arithmetical operations are performed according to the autonomous positioning using the acquired values and the initial position (X, Y) to identify a position of the vehicle C relative to the initial position (X, Y). If it is identified that the vehicle C has moved into the intersection service ending area 1360 as a result of the arithmetical operations using the autonomous positioning, the display of the image captured by the selected camera 1220 is terminated, ending the provision of the intersection service. In the intersection system, the provision of the various services is implemented by the vehicle system (a transit support apparatus) equipped on the vehicle C executing a predetermined program according to the position of the vehicle C.

Figure 15:
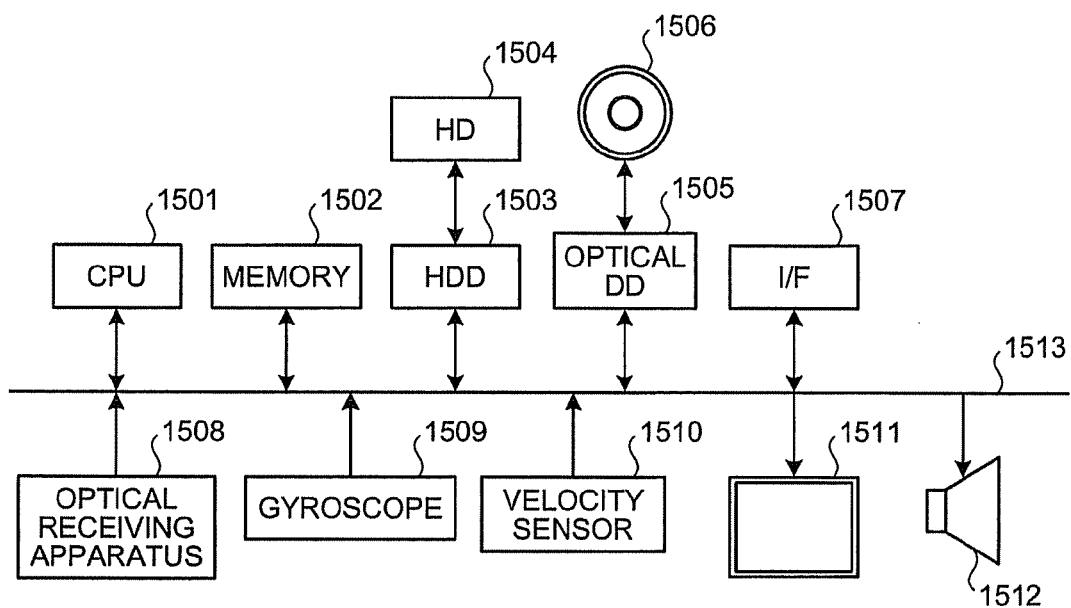
FIG. 15 is a block diagram of the vehicle system.

FIG. 15 is a block diagram of the vehicle system. As depicted in FIG. 15, the vehicle system includes a central processing unit (CPU) 1501, a memory 1502, a hard disk drive (HDD) 1503, a hard disk (HD) 1504, an optical disk 1506, an optical disk drive (optical DD) 1505, an interface (I/F) 1507, an optical receiving apparatus 1508, a gyroscope 1509, velocity sensor 1510, a display 1511, and a speaker, connected to one another by way of a bus 1513.

The CPU 1501 governs overall control of the vehicle system. The memory 1502 is implemented by a ROM storing therein programs such as a boot program and a RAM used as a work area of the CPU 1501. The HDD 1503, under the control of the CPU 1501, controls the reading and writing of data with respect to the HD 1504. The HD 1504 stores therein the data written under control of the HDD 1503. The HD 1504, for example, stores rewritable map information, traffic information, etc.

The optical DD 1505, under the control of the CPU 1501, controls the reading and writing of data with respect to the optical disk 1506. The optical disk 1506 stores therein the data written under control of the optical DD 1505, the stored data being read by the CPU 1501. The optical disk 1506 is a removable recording medium.

The optical disk 1506, specifically, for example, is CD-ROM (CD-R, CD-RW), digital versatile disk (DVD), etc. A recording medium other than the optical disk 1506 may be used as the recordable recording medium, such as a flexible disk, an MO, a memory card, etc.

The I/F 1507 is connected to a network such as the Internet through a communication line and is connected to other apparatuses through the network. The I/F 1507 administers an internal interface with the network and controls the input and output of data from external apparatuses such as the center apparatus 1210. Further, the I/F 1507 receives optical signals output from the optical beacon 101.

The gyroscope 1509 measures directional changes of the vehicle C. The velocity sensor 1510 detects the distance traveled by the vehicle C. The position of the vehicle C with respect to a reference position (e.g., the initial position (X, Y)) may be calculated by a computation according to the autonomous positioning using the coordinates of the reference position, the direction detected by the gyroscope 1509, and the traveled distance detected by the velocity sensor 1510. As the autonomous positioning computation is a known technology, description is omitted herein.

The display 1511 displays data such as the traffic information, images captured by the camera 1220, etc. The display may further display a map, the current vehicle position on the map, a guide route, etc., as well as a list of various functions provided by the vehicle system.

Functions included in the displayed list may be selected through the operation of an operation unit (not depicted) equipped on the vehicle C. Various known operation units, such as keys, a touch panel, a remote controller, etc. may be employed as the operation unit and further description is omitted herein. A thin-film-transistor (TFT) liquid crystal display may be adopted as the display 1511. Description of liquid crystal displays, including a thin-film-transistor (TFT) liquid crystal display is omitted herein as such technologies are commonly known.

The speaker 1512 includes a voice coil, a magnet provided around the voice coil, and a speaker cone affixed to the voice coil. When current is driven through the voice coil under the control of the CPU 1501, the speaker. 1512 outputs audio using the magnetic field created, near the voice coil, by the magnet. As the configuration and method of audio output are commonly known, further description is omitted herein.

Figure 16:
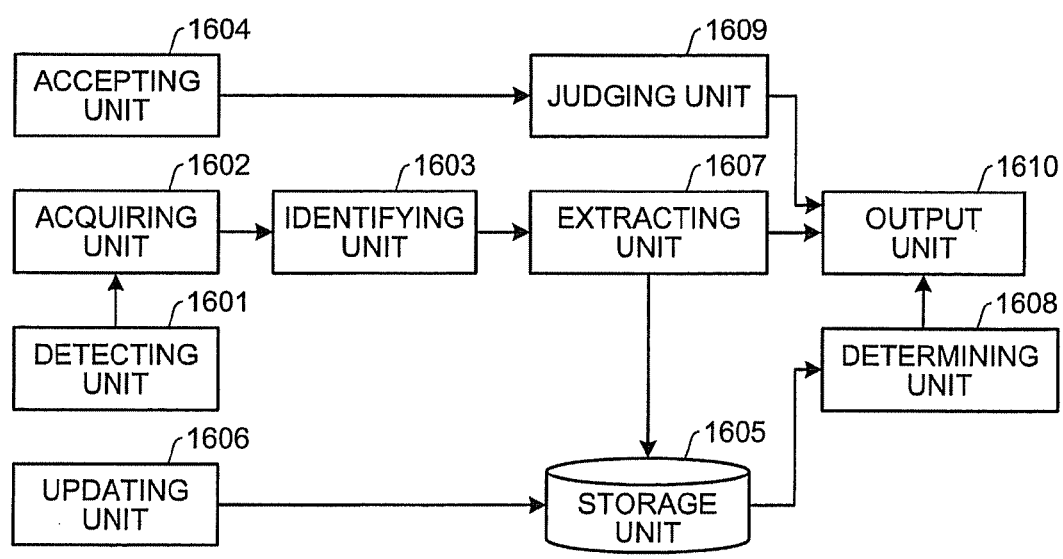
FIG. 16 is a block diagram of a functional configuration of the vehicle system.

FIG. 16 is a block diagram of a functional configuration of the vehicle system. As depicted in FIG. 16, the functions of the vehicle system are implemented by a detecting unit 1601, an acquiring unit 1602, an identifying unit 1603, an accepting unit 1604, a storage unit 1605, an updating unit 1606, an extracting unit 1607, a determining unit 1608, a judging unit 1609, and an output unit 1610.

The detecting unit 1601 detects the passing of the initial position (X, Y) by the vehicle C, based on the optical receiving state of the optical receiving apparatus 1508, i.e., the state when the optical signal 310 incident on the optical receiving apparatus 1508 is blocked. When the rate of the amount of light received at the receiving unit of the optical receiving apparatus 1508 relative to the amount of light received at the comparative receiving unit becomes equal to or less than a predetermined threshold value, the detecting unit 1601 determines that the optical signal 310 incident on the optical receiving apparatus 1508 has been blocked to thereby detect that the vehicle C has passed the initial position (X, Y). Specifically, for example, a function of the detecting unit 1601 may be implemented by the CPU 1501 executing a program stored in the memory 1502 based on the value output from the optical receiving apparatus 1508.

If the detecting unit 1601 detects the passage of the vehicle C, the acquiring unit 1602 acquires information about a position relative to the initial position (X, Y) for the vehicle C continuously moving after passing through the initial position setting area 1310. Specifically, for example, a function of the acquiring unit 1602 may be implemented by the CPU 1501 executing a program stored in the memory 1502 based on the values output from the gyroscope 1509 and the velocity sensor 1510.

The identifying unit 1603 identifies the position of the vehicle C with respect to the intersection 1230 based on the information acquired by the acquiring unit 1602. The identifying unit 1603 calculates the current position coordinates of the vehicle C by adding the direction of travel and the traveled distance of the vehicle C to the initial position (X, Y) based on the output values from the gyroscope 1509 and the velocity sensor 1510, for example.

The position coordinates of the vehicle C are then calculated with respect to the intersection 1230, based on the calculated position coordinates and the center coordinates of the intersection 1230. The identifying unit 1603 calculates absolute position coordinates representative of a given point on a map, for example. The identifying unit 1603 may calculate position coordinates representative of a relative position to the intersection 1230. The center coordinates of the intersection 1230 are known values available from the map information stored in the HD 1504. Specifically, for example, a function of the identifying unit 1603 may be implemented by the CPU 1501 executing a program stored in the memory 1502.

The accepting unit 1604 receives input of the area specification information. The accepting unit 1604 receives the input of the area specification information by receiving an optical signal transmitted from the optical beacon 101 through the I/F 1507, for example. Specifically, for example, a function of the accepting unit 1604 may be implemented by the above operating units (such as keys, a touch panel, and a remote controller).

The storage unit 1605 stores the map information and the traffic information correlated with the intersection 1230 in the map represented by the map information. The position of the intersection 1230 in the map is represented by the coordinate information of the center of the intersection 1230. Specifically, for example, a function of the storage unit 1605 may be implemented by the HDD 1503 and the HD 1504. Specifically, for example, a function of the storage unit 1605 may also be implemented by the above optical DD 1505 and the optical disk 1506.

The updating unit 1606 updates the traffic information stored in the HD (storage device) 1504 based on the information distributed from the center apparatus 1210. Specifically, for example, a function of the updating unit 1606 may be implemented by the CPU 1501 executing a program stored in the memory 1502 to control the HDD 1503 and rewrite the traffic information stored in the HD 1504.

The extracting unit 1607 extracts traffic information (hereinafter, "specific traffic information") correlated with a position identified by the identifying unit 1603, from traffic information concerning the intersection 1230 and stored in the storage unit 1605. The extracting unit 1607 compares, for example, position coordinates indicative of the intersection 1230 and roads around the intersection 1230 with the position coordinates of the vehicle C relative to the intersection 1230 to extract the traffic information correlated with position coordinates identical to the position coordinates of the vehicle C relative to the intersection 1230. Specifically, for example, a function of the extracting unit 1607 may be implemented by the CPU 1501 executing a program stored in the memory 1502.

If multiple items of the specific traffic information are extracted by the extracting unit 1607, the determining unit 1608 determines respective priorities of the extracted items. The determining unit 1608 updates and determines the priority of the specific traffic information as needed based on at least one type of information among information concerning the vehicle C (such as output values of the gyroscope 1509 and the velocity sensor 1510), information concerning the environment around the vehicle C (such as traffic volume, the number of pedestrians, and visibility of the intersection 1230), and biological information concerning the driver of the vehicle C (such as changes in heart rate and the number of blinks).

The judging unit 1609 judges whether the position identified by the identifying unit 1603 is a position within the service execution areas. The judging unit 1609 compares the position coordinates of the various areas for the intersection 1230 with the identified position coordinates of the vehicle C and judges that the position identified by the identifying unit 1603 is within the service execution areas if any area includes position coordinates identical to the identified position coordinates of the vehicle C.

The judging unit 1609 judges whether the position identified by the identifying unit 1603 is a position within the service execution areas based on the latest area specification information received by the accepting unit 1604. Specifically, for example, a function of the judging unit 1609 may be implemented by the CPU 1501 executing a program stored in the memory 1502 and using the map information stored in the HD 1504.

The output unit 1610 outputs the traffic information (specific traffic information) extracted by the extracting unit 1607. For example, if the extracted traffic information is information related to elicit attention at the time of the passage through the intersection 1230, the output unit 1610 displays text information on the display 1511 to elicit attention (such as "watch for pedestrians from rear" in the case of a left turn) or outputs audio through the speaker 1512 (such as "watch for oncoming cars" in the case of a right turn).

For example, if the extracted traffic information is information related to the provision of a blind spot image, the output unit 1610 outputs to the units related to the provision of the blind spot image through the I/F 1507, information for activating or commencing operation of the units. Specifically, for example, a function of the output unit 1610 may be implemented by the display 1511, the speaker 1512, the I/F 1507, etc.

If the extracting unit 1607 extracts multiple items of the specific traffic information, the output unit 1610 sequentially outputs the items according to the priorities determined by the determining unit 1608. The output unit 1610 outputs the traffic information correlated with the relevant areas if the position of the vehicle C is located within the various areas and terminates the output of the traffic information correlated with the areas if the position of the vehicle C is located outside the various areas, based on the judgment result of the judging unit 1609.

The judging unit 1609 may judge whether the position identified by the identifying unit 1603 is a position within the service execution starting area or the service execution ending area. The service execution starting area and the service execution ending area are indicated by coordinates relative to the initial position (X, Y). If the vehicle C enters the service execution starting area, the activation of the available services is started according to the intersection 1230. If the vehicle C enters the service execution ending area, the provision of all services available for the intersection 1230 is terminated.

In this case, the output unit 1610 outputs the relevant traffic information if the position identified by the identifying unit 1603 is included in the service execution starting area and terminates the output of the traffic information if the identified position is included in the service execution ending area, based on the judgment result of the judging unit 1609.

Figure 17:
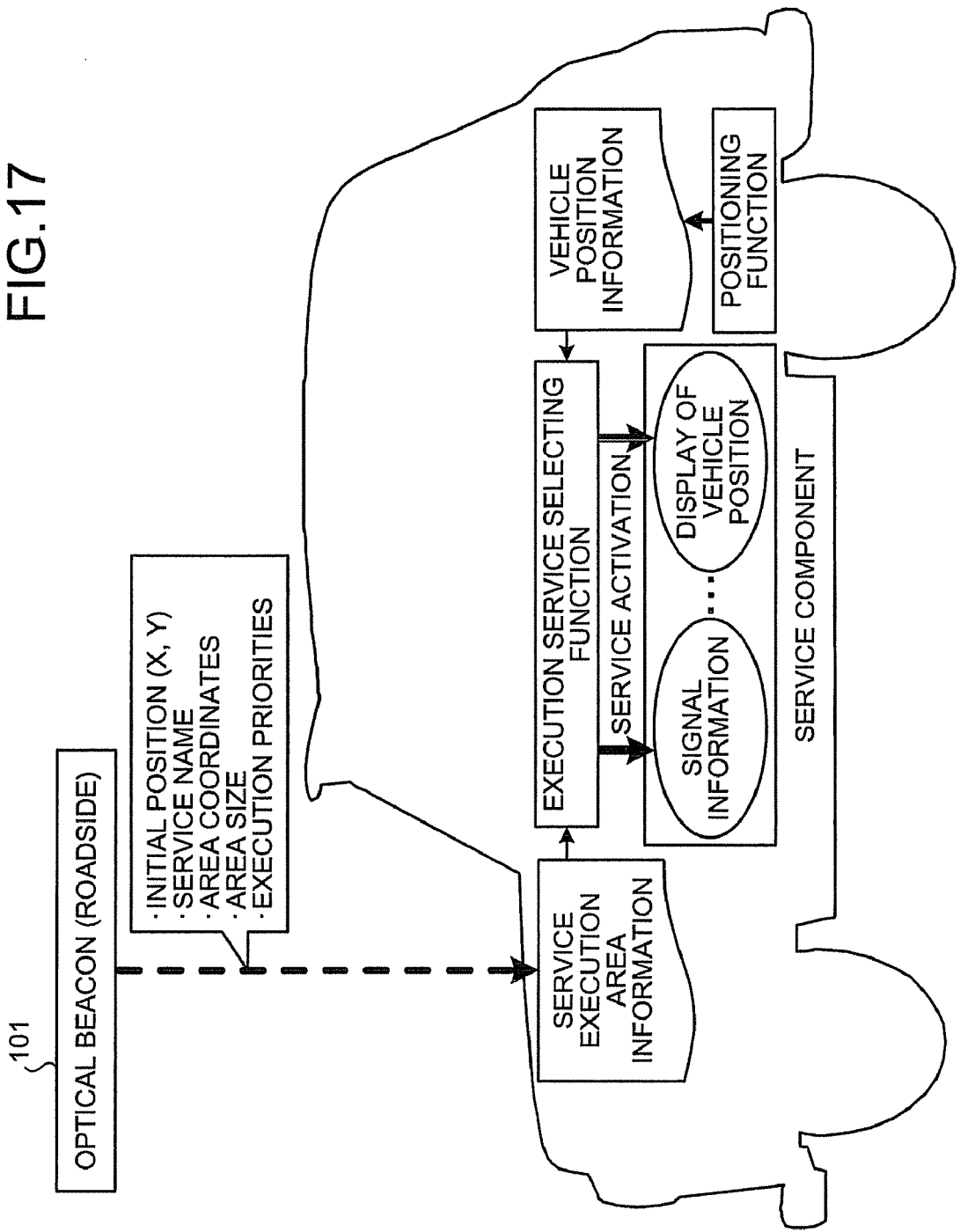
FIG. 17 is an explanatory diagram of the vehicle system.

FIG. 17 is an explanatory diagram of the vehicle system. In FIG. 17, the vehicle system implements a positioning function of determining the position of the vehicle C (vehicle position of the user) and an executed service selecting function of selecting the services of respective intersections according to the vehicle position of the user as determined by the above units.

The vehicle receives the optical signal transmitted from the optical beacon 101 and extracts information such as an initial position (X, Y), names of available services, area coordinates and area size, and priorities of execution of the service provision. The information acquired from the optical signal is loaded as the service execution area information into the vehicle system.

Service components (such as signal information and program information for displaying the vehicle position) for providing the services identified by the service names are stored in advance in a storage device such as the HD 1504 included in the vehicle C. The service components are regularly or irregularly distributed from the center apparatus 1210, etc., and stored through the I/F 1507 in a storage device such as the HD 1504.

The executed service selecting function includes using the vehicle position information for the user acquired from the positioning function and the service execution area information acquired from the optical signal to select a service to be provided and activate the selected service. When the service is activated, a relevant service component is activated. With such a function in the vehicle system, a service corresponding to the vehicle position of the user may be provided.

Figure 18:
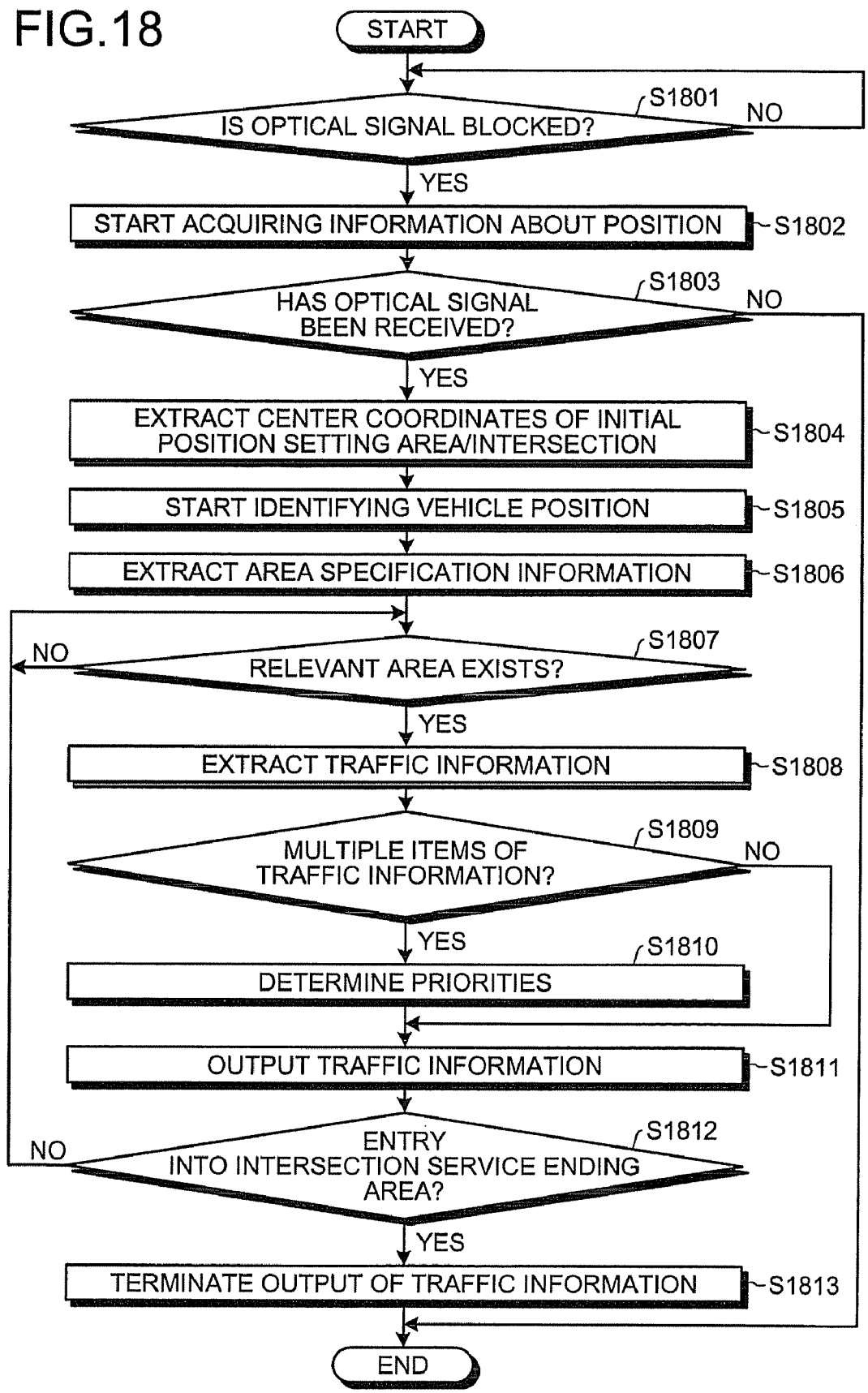
FIG. 18 is a flowchart of processing by the vehicle system making up the intersection service system according to the fifth embodiment.
Figure 19:
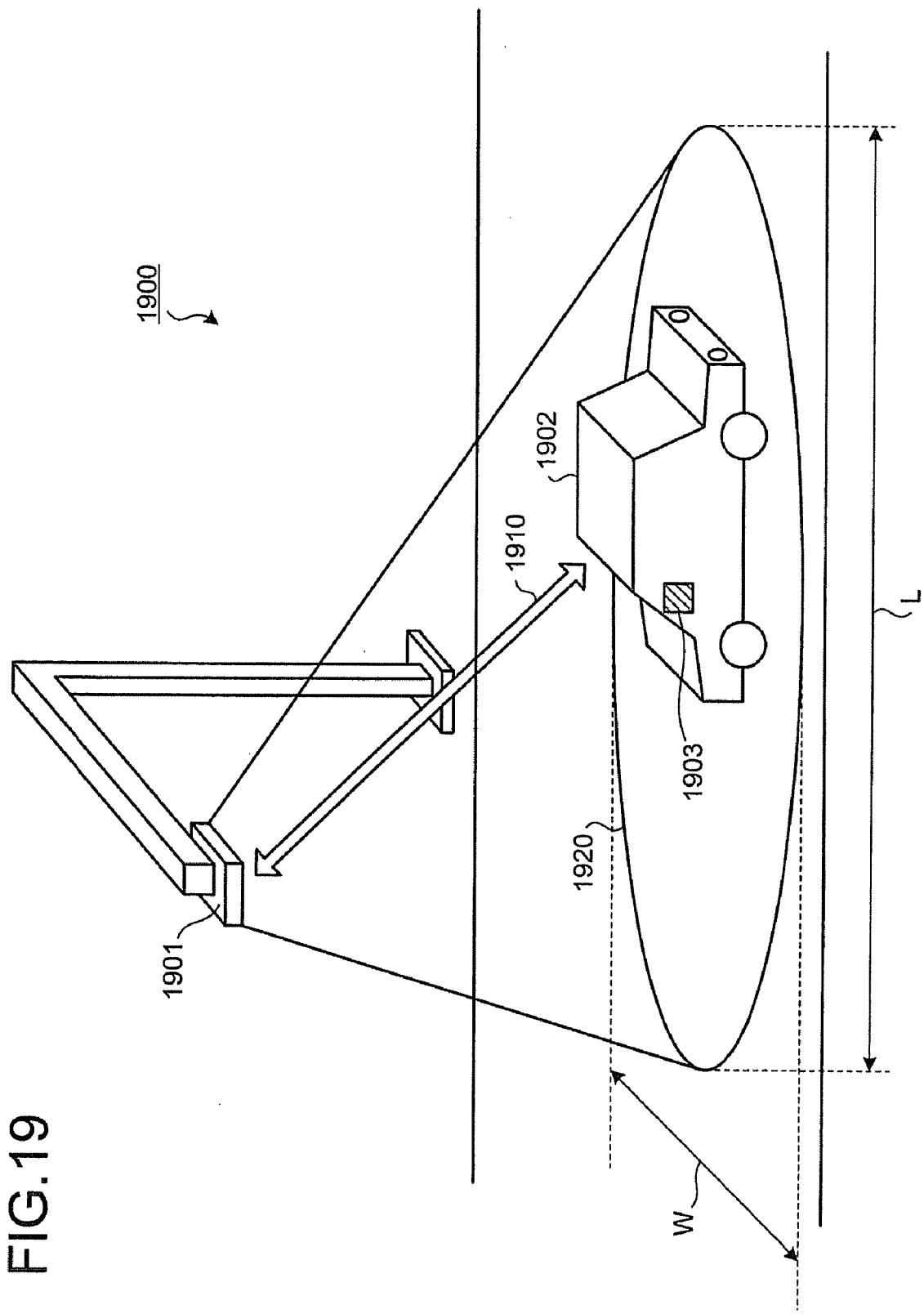
FIG. 19 is an explanatory diagram of a position locating system using an optical beacon.

FIG. 18 is a flowchart of processing by the vehicle system making up the intersection service system according to the fifth embodiment. As depicted in the flowchart of FIG. 18, the system waits for the optical signal to be blocked at the optical receiving apparatus 1508 (step S1801: NO). When the optical signal is blocked (step S1801: YES), information related to the position of the vehicle C starts to be acquired (step S1802). At step S1802, specifically, the output values from the gyroscope 1509 and the velocity sensor 1510 are detected. The process at step S1802 is continuously executed until the vehicle C exits the intersection.

It is determined whether the optical signal transmitted from the optical beacon 101 has been received through the I/F 1507 (step S1803), and if the signal has not been received (step S1803: NO), a series of the processing is terminated. If the optical signal has been received at step S1803 (step S1803: YES), the center coordinates of the initial position setting area 1310 and the intersection 1230 are extracted from the optical signal received at step S1803: YES (step S1804).

The current position of the vehicle C (vehicle position of the user) starts to be identified using the center coordinates of the initial position setting area 1310 and the intersection 1230 and the information started to be acquired at step S1802. The processing at step S1805 is continuously executed until the vehicle C exits the intersection.

The area specification information is extracted from the optical signal received at step S1803: YES (step S1806). It is determined whether an area (relevant area) including the user vehicle position r identified at step S1805 is among the areas 1310 to 1360 specified by the extracted area specification information (step S1807). At step S1807, the system waits until a relevant area is found (step S1807: NO).

When the area including the user vehicle position identified at step S1805 is found at step S1807 (step S1807: YES), the traffic information correlated with the area including the user vehicle position is extracted from the HD 1504 (step S1808) to determine whether multiple items of the traffic information have been extracted (step S1809).

If one item of traffic information is extracted at step S1809 (step S1809: NO), the process proceeds to step S1811 to output the extracted traffic information to destination external to the vehicle system (step S1811). On the other hand, if multiple items of the traffic information have been extracted (step S1809: YES), the priorities are determined (S1810) and the process proceeds to step S1811 to output the extracted traffic information.

It is determined whether the user vehicle position started to be identified at step S1805 has entered the intersection service ending area 1360 (step S1812) and, if not (step S1812: NO), the process returns to step S1807. If the position is in the area (step S1812: YES), the output of all the items of the traffic information is terminated including the traffic information being output at the time of entry (step S1813), thereby terminating a series of the processing.

As described, according to the fifth embodiment, by accurately identifying the position of the vehicle C and outputting the traffic information appropriate for each identified position, services useful to vehicles C traveling through the intersection 1230 may be provided to each vehicle C passing through the intersection 1230. Therefore, the safety (of the driver) of the vehicle C traveling through the intersection 1230, pedestrians, etc. may be improved while achieving effective utilization of existing facilities.

According to the fifth embodiment, if multiple items of traffic information are extracted at one time, services useful to a vehicle C traveling through the intersection 1230 may be provided in the order of usefulness by determining priorities and outputting the traffic information according to the determined priorities.

Therefore, for example, if the areas overlap with each other or multiple items of the traffic information are extracted at one time due to an error in arithmetical operations of the autonomous positioning, highly useful traffic information may certainly be output, there by improving the safety (of the driver) of the vehicle C traveling through the intersection 1230, pedestrians, etc., while achieving effective utilization of existing facilities.

According to the fifth embodiment, the priorities may be determined as needed according to the priorities of information related to the vehicle C or the behavior of the vehicle C, such as information concerning the vehicle C, information concerning the environment around the vehicle C, or biological information concerning the driver of the vehicle C. Therefore, optimal traffic information is preferentially output as needed according to changes in circumstances, thereby improving the safety (of the driver) of the vehicle C traveling through the intersection 1230, pedestrians, etc., while achieving effective utilization of existing facilities.

According to the fifth embodiment, the traffic information may be output if the position of the vehicle C is located within the service execution areas 1320 to 1350. Therefore, the traffic information suitable for the vehicle position may be output, thereby improving the safety (of the driver) of the vehicle C traveling through the intersection 1230, pedestrians, etc., while achieving effective utilization of existing facilities.

According to the fifth embodiment, the positions and sizes of the various areas 1310 to 1360 may be changed. Therefore, service execution areas of various sizes and shapes may be set flexibly such as a service execution area across multiple lanes, a service execution area located only in the right lane, and a service execution area located only in the intersection 1230, for example.

Thus, traffic information suitable for the vehicle position may always be output corresponding to changes in circumstances with respect to the intersection 1230, such as fluctuations in traffic volume associated with different time periods, thereby improving the safety (of the driver) of the vehicle C traveling through the intersection 1230, pedestrians, etc., while achieving effective utilization of existing facilities.

According to the fifth embodiment, the positions and sizes of the various areas 1310 to 1360 may be defined according to the area specification information included in the optical signal received at the time of passage through the initial position (X, Y). Therefore, traffic information suitable for the vehicle position may always be output corresponding to changes in circumstances with respect to the intersection 1230, such as fluctuations in traffic volume associated with different time periods, thereby improving the safety (of the driver) of the vehicle C traveling through the intersection 1230, pedestrians, etc.

According to the fifth embodiment, the area specification information may define the positions and sizes of the service execution areas according to the area specification information updated depending on the information related to the vehicle C or the behavior of the vehicle C useful for passage through the intersection 1230, information such as information concerning the environment around the intersection 2130, information concerning the environment around the vehicle C, or biological information concerning the driver of the vehicle C.

Therefore, traffic information suitable for the vehicle position may always be output corresponding to changes in circumstances with respect to the intersection 1230, such as fluctuations in traffic volume associated with different time periods, thereby improving the safety (of the driver) of the vehicle C traveling through the intersection 1230, pedestrians, etc., while achieving effective utilization of existing facilities.

According to the fifth embodiment, the output of the traffic information may be started when the vehicle position is included in the initial position setting area 1310 and the output of the traffic information may be terminated when the vehicle position is included in the intersection service ending area 1360. Therefore, the traffic information suitable for the vehicle position may be output, thereby improving the safety (of the driver) of the vehicle C traveling through the intersection 1230, pedestrians, etc., while achieving effective utilization of existing facilities.

According to the fifth embodiment, the traffic information stored in the HD 1504 may be updated to provide updated traffic information even if the timing at which signals at the intersection 1230 change is updated or the relationship of a road connected to the intersection has changed (due to construction of a new road, etc.), for example. Therefore, traffic information suitable for the vehicle position may be output corresponding to changes in circumstances, thereby improving the safety (of the driver) of the vehicle C traveling through the intersection 1230, pedestrians, etc., while achieving effective utilization of existing facilities.

According to the fifth embodiment, since traffic information concerning conditions beyond the intersection 1230, etc. is provided to a vehicle C located in the straight-ahead vehicle service providing area 1340, the vehicle C may alter its route to make a left turn, etc. at the intersection according to traffic conditions. Therefore, the safety (of the driver) of the vehicle C traveling through the intersection 1230, pedestrians, etc. may be improved while achieving the effective utilization of the existing facilities, and the comfort of driving may be improved.

Although the first to the fifth embodiments have a configuration in which on the side of the optical receiving apparatus 300, a blocking plate is provided on the optical receiving apparatus, a sixth embodiment has a configuration in which, on side of the optical beacon 101, a regulating unit that regulates a transmission area of the optical signal is provided instead. Therefore, a boundary of the transmission area may artificially be generated to create a clear boundary and set a position of the boundary.

The starting point and the ending point of the transmission area may freely be set by setting positions of boundaries with the regulating unit. The position location is implemented by detecting, on the vehicle 102 side, an event of contact with an area boundary. Since the accuracy of position location varies according to conditions (such as road grade, weather, and road shape) at the disposition point of the optical beacon 101, the accuracy of position location may be improved by setting the area boundaries at suitable positions with consideration of the surrounding conditions. It is assumed that the navigation apparatus 620 having the optical receiving apparatus 300 without the blocking plate is equipped on the vehicle 102.

Figure 20:
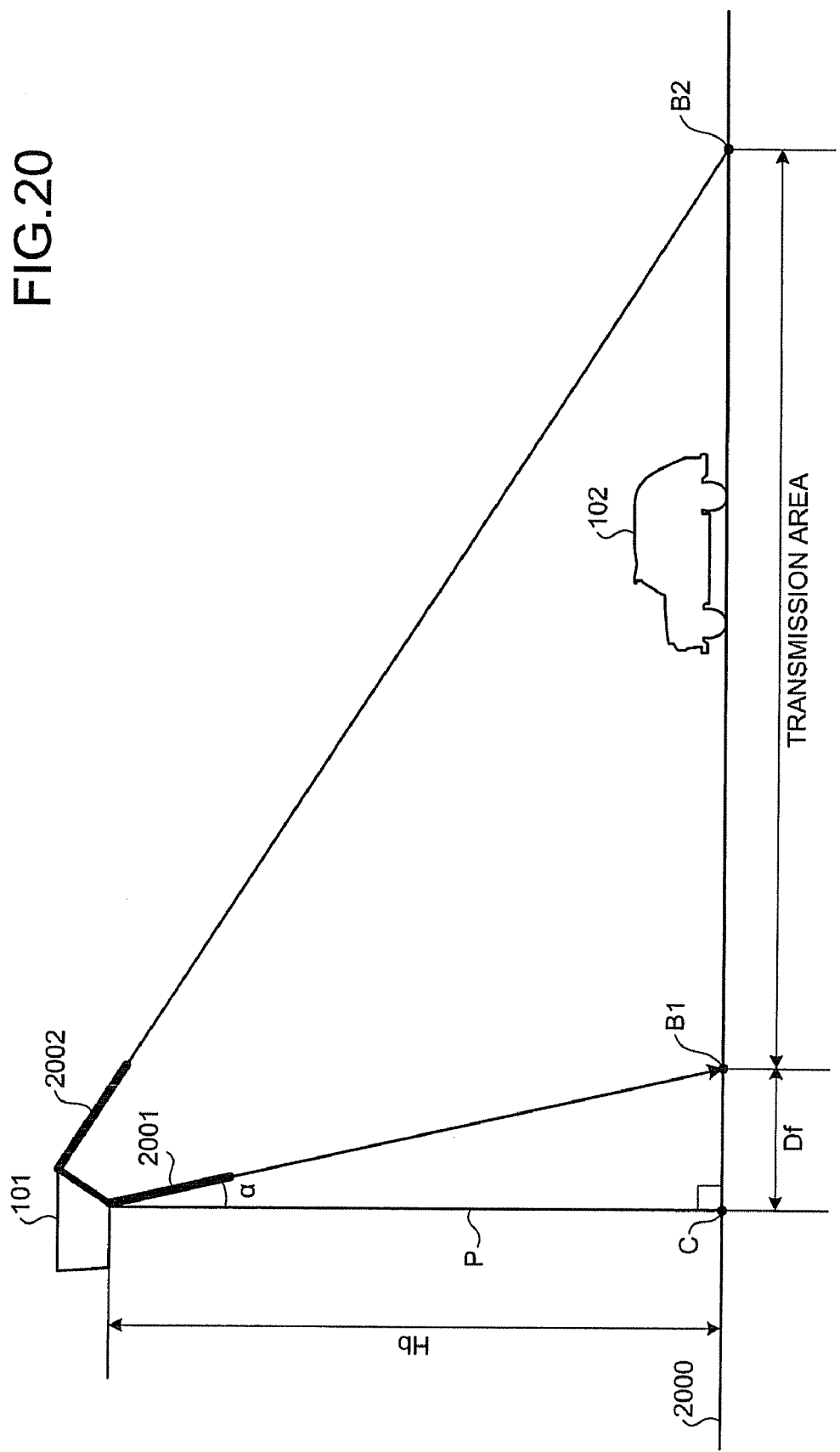
FIG. 20 is an explanatory diagram of an optical beacon according to a sixth embodiment.
Figure 21:
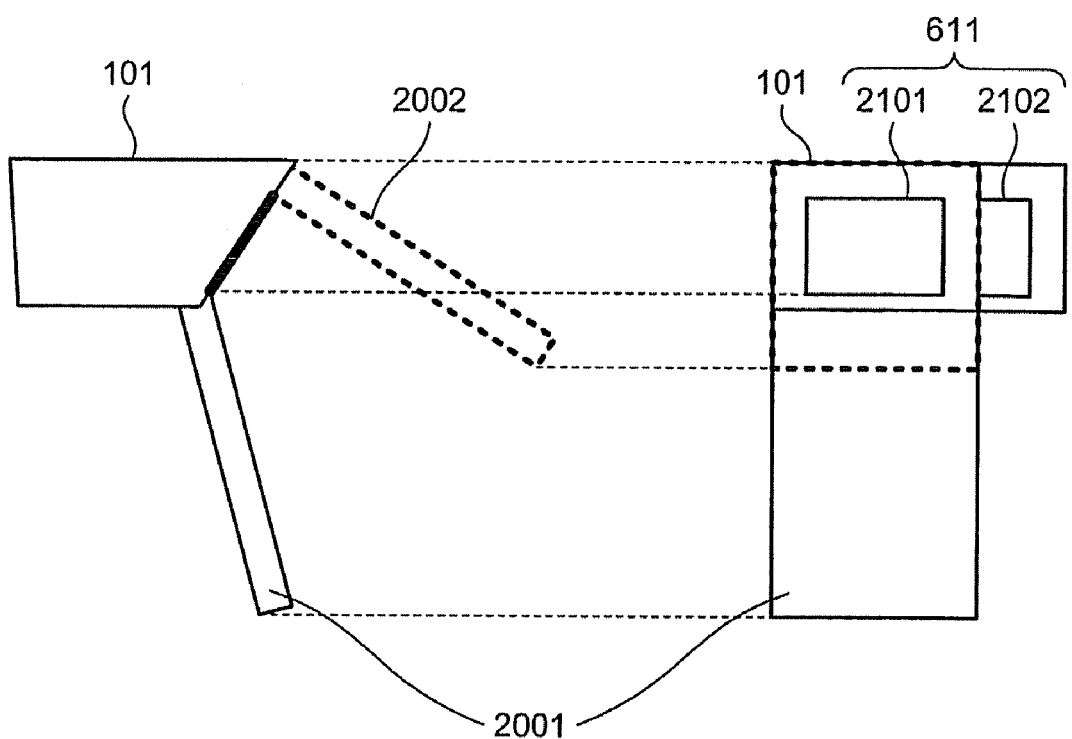
FIG. 21 depicts a side view and a front view of the optical beacon.

FIG. 20 is an explanatory diagram of the optical beacon according to the sixth embodiment and FIG. 21 depicts a side view and a front view of the optical beacon 101. In FIG. 20, the longitudinal direction of the road surface 2000 is along the lane direction and a direction penetrating the plane of FIG. 20 is the vehicle width direction. As depicted in FIG. 20, the optical beacon 101 includes a first regulating plate 2001 and a second regulating plate 2002. The first regulating plate 2001 is a regulating plate that regulates a boundary B1 that is the ending point of the transmission area and the second regulating plate 2002 is a regulating plate that regulates a boundary B2 that is the starting point of the transmission area.

As depicted in FIG. 21, the optical beacon 101 includes the optical transceiver 611 consisting of a downlink optical transmitting apparatus 2101 and an uplink optical receiving apparatus 2102. The optical transmitting apparatus 2101 transmits the optical signal that includes the position information of the optical beacon 101 toward the road surface 2000. The optical signal is transmitted to the transmission area between the boundaries B2 and B1 by the first regulating plate 2001 and the second regulating plate 2002.

In FIG. 20, Hb denotes a height of the optical beacon 101 represented by a perpendicular line P dropped from the optical beacon 101 to the road surface 2000, and Df denotes a distance from an intersecting point C, which is formed by dropping the perpendicular line P to the road surface 2000, to the ending point B1. α denotes a disposition angle of the first regulating plate 2001 along the lane direction. Since α denotes an angle formed by the perpendicular line P and the first regulating plate 2001, α may be represented with Hb and Df as α=arctan(Df/Hb). As a result, the light may be blocked at the ending point B1.

Figure 22:
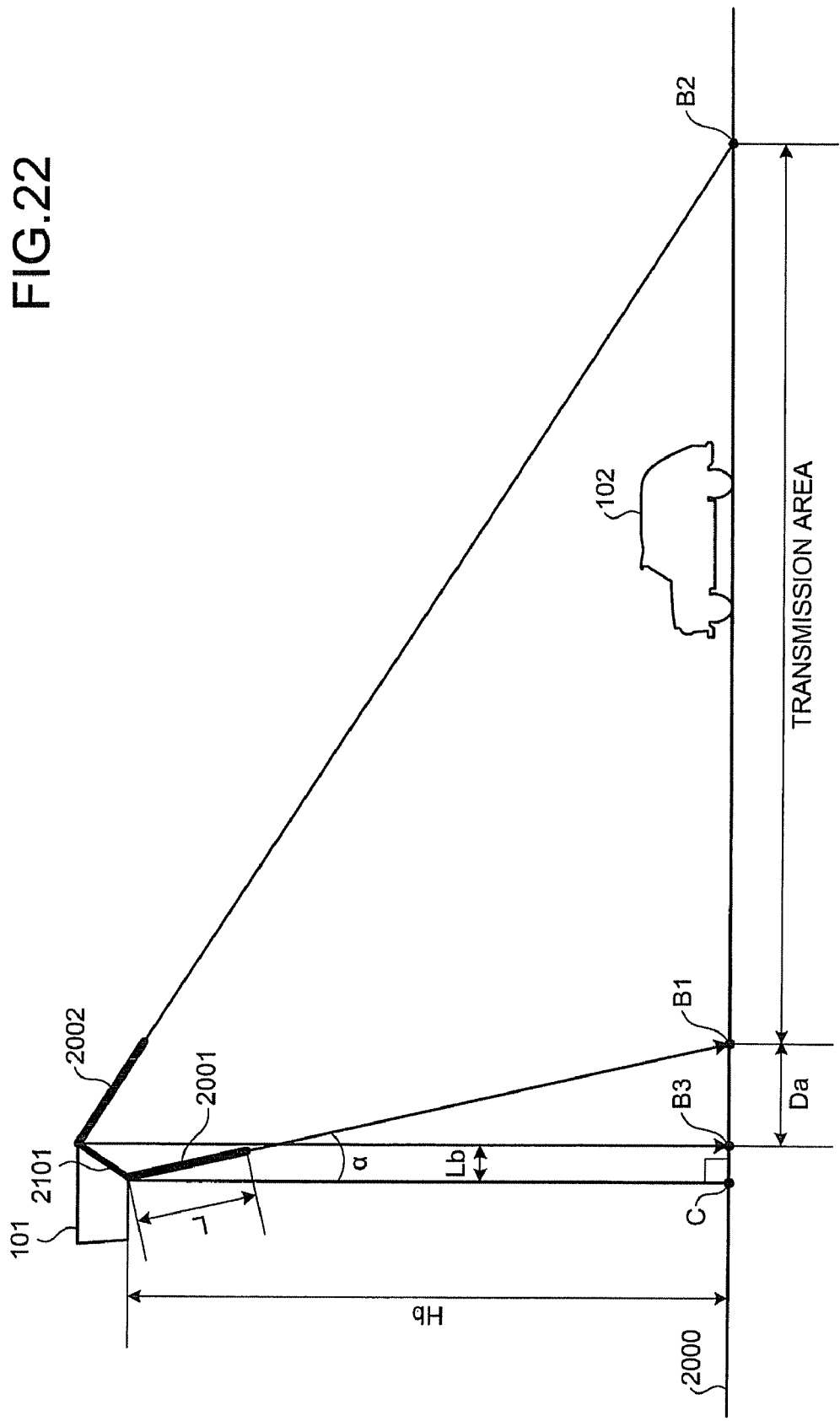
FIG. 22 is an explanatory diagram of optical leakage at a boundary B1.

FIG. 22 is an explanatory diagram of optical leakage at the boundary B1. Since the optical transmitting apparatus 2101 is disposed to be inclined toward the road surface 2000, the optical transmitting apparatus 2101 has a length Lb along the lane direction. The light leaks due to Lb, from the boundary B1 that is the ending point to a boundary B3 that is a point outside the transmission area. If Da denotes a length of the range of the optical leakage along the lane direction, a length L of the first regulating plate 2001 along the direction projecting toward the road side 2000 may be obtained from the following equation.

$$L = Hb \times Lb / \{(Lb+Da)\cos \alpha\}$$

Since Da is shortened by elongating L in this equation, the boundary B1 and the boundary B3 may be equalized by constraining the length of DA within an allowable range (accuracy) and the light may be blocked at the ending point B1.

Figure 23:
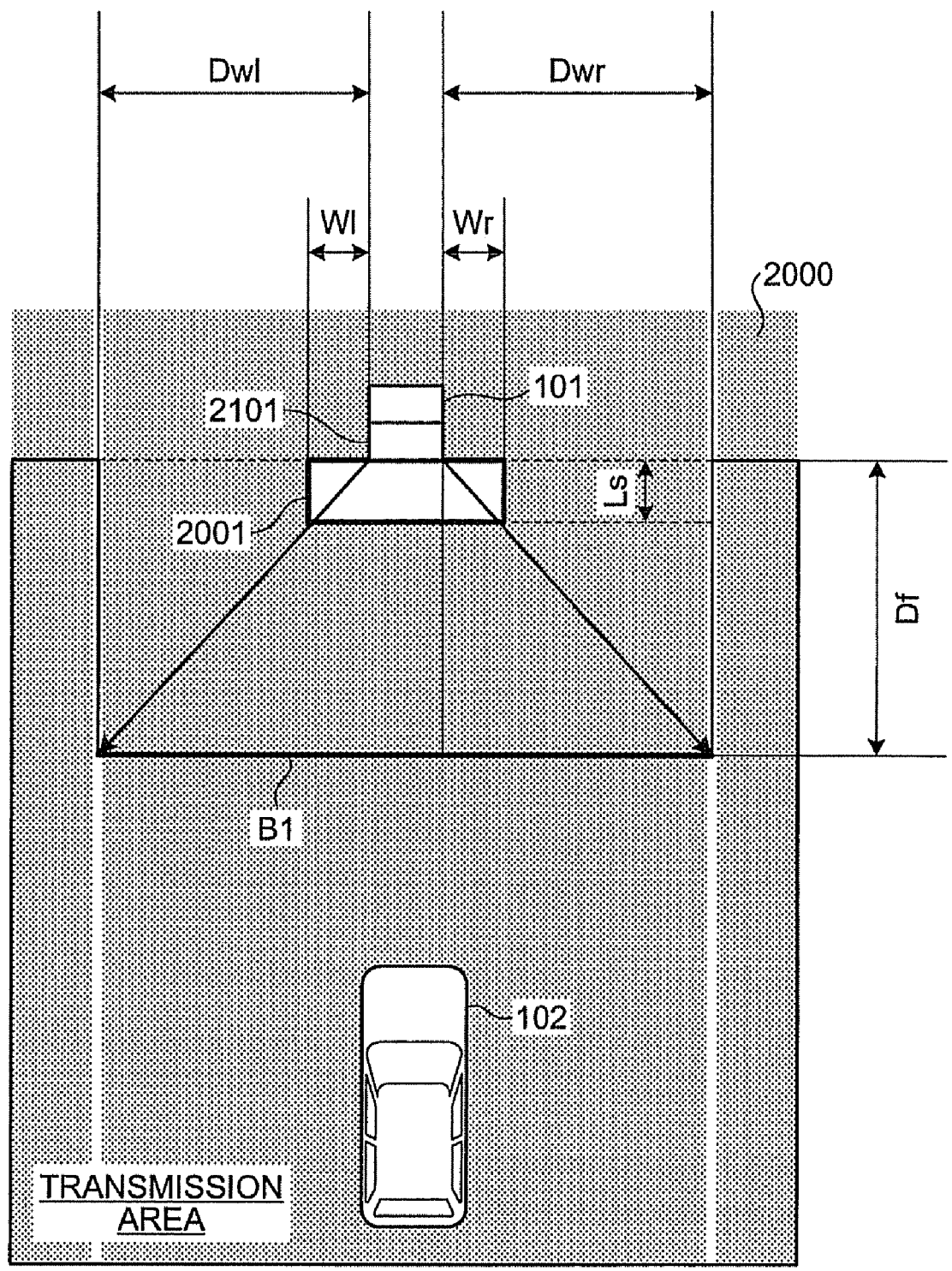
FIG. 23 is an explanatory diagram of a position of a first regulating plate along the vehicle width direction.

FIG. 23 is an explanatory diagram of a position of the first regulating plate 2001 along the vehicle width direction. To set the effectiveness of the boundary B1 along the vehicle width, the position of the first regulating plate 2001 along the vehicle width direction is set on the basis of the optical transmitting apparatus 2101. As depicted in FIG. 23, a length Ls from the optical transmitting apparatus 2101 to the first regulating plate 2001 as viewed from the top surface of the optical beacon 101 may be represented by Ls=L sin α using the disposition angle α (see FIG. 22) of the first regulating plate 2001 along the vehicle lane direction.

When Df denotes a distance from the position of the optical beacon 101 to the boundary B1 along the lane direction and Dwr denotes an effective distance of the boundary B1 in the vehicle width direction on the right side when facing the optical beacon 101, a length Wr of the first regulating plate 2001 on the right side along the vehicle width direction may be obtained from the following equation.

$$Wr=(Dwr \times L \sin \alpha)/Df$$

Similarly on the left side, if Df denotes a distance from the position of the optical beacon 101 to the boundary B1 along the lane direction and Dwl denotes an effective distance of the boundary B1 along the vehicle width direction on the left side when facing the optical beacon 101, a length W1 of the first regulating plate 2001 on the left side along the vehicle width direction may be obtained from the following equation.

$$Wl=(Dwl \times L \sin \alpha)/Df$$

With these equations, the range of the boundary B1 along the vehicle width direction may be set by forming the first regulating plate 2001 in a shape projecting from the optical transmitting apparatus 2101 toward the left and the right by Wl and Wr, respectively.

Figure 24:
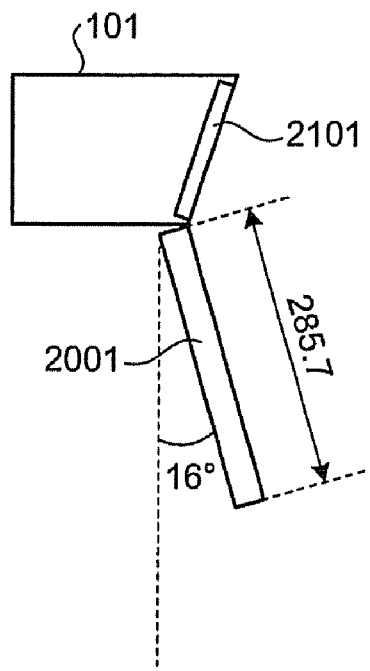
FIG. 24 is a side view of an example of the first regulating plate.
Figure 25:
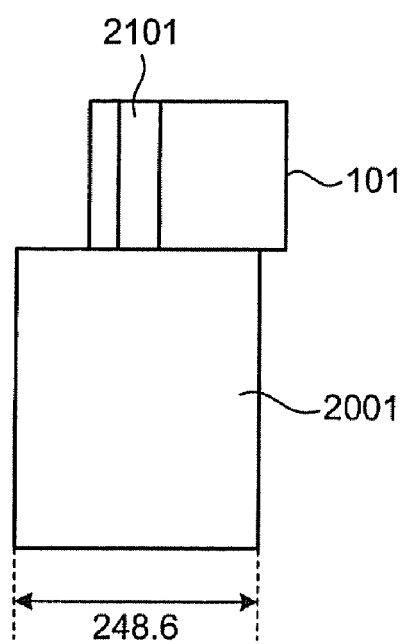
FIG. 25 is a front view of an example of the first regulating plate.

FIG. 24 is a side view of an example of the first regulating plate 2001. FIG. 25 is a front view of an example of the first regulating plate 2001. Numeric values depicted in FIGS. 24 and 25 denote dimensions (in [mm]) and an angle (in [degrees]) of the first regulating plate 2001. Although the positioning accuracy is approximately 12 [m] according to an existing position location scheme since the position is approximated to the transmission area, the positioning accuracy is 1 [m] in the example depicted in FIGS. 24 and 25.

According to the sixth embodiment, the blocking plate 402 may be omitted from the optical receiving apparatuses 300 of the vehicles 102 since the first regulating plate 2001 is provided on the optical beacon 101. Therefore, even a vehicle 102 without the blocking plate 402 on the optical receiving apparatuses 300 may perform highly accurate position location.

Since the boundary of the transmission area may clearly be regulated, highly accurate position location may be achieved for the vehicle 102.

Although the angle α is fixed in the case of the above first regulating plate 2001, the angle α may be variable. Specifically, for example, if the optical signal (or a signal using electromagnetic waves) is insufficiently received on the vehicle side due to external factors such as weather conditions and internal factors such as reduction in the light intensity caused by deterioration of the optical signal transmitting unit, the angle is changed to expand the communication range such that the communication may be performed with certainty. The angle α may be changed manually or by automatic control. An example of a configuration for automatic control will hereinafter be described.

Figure 26:
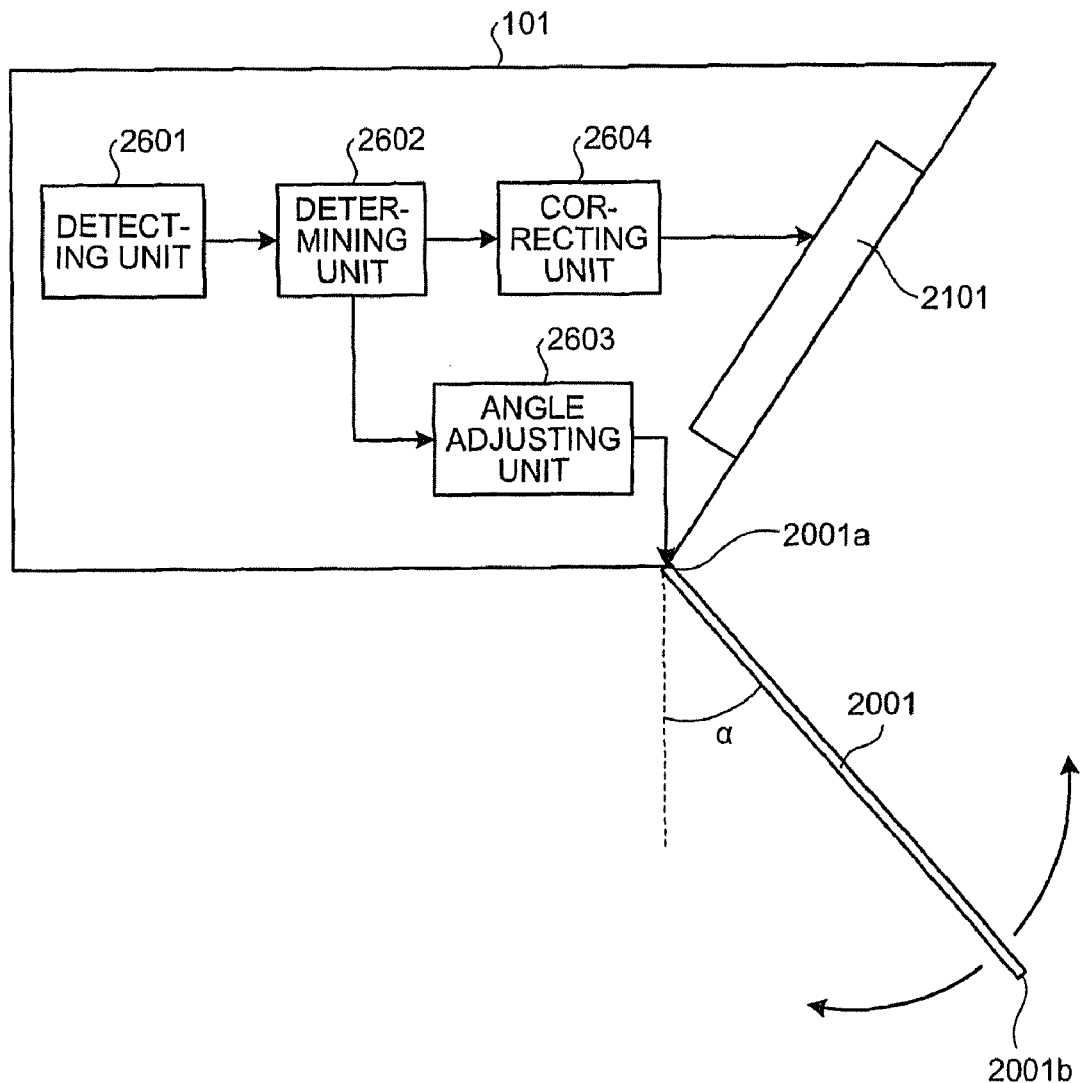
FIG. 26 is an explanatory diagram of a configuration for automatic control of the first regulating plate in the optical beacon.

FIG. 26 is an explanatory diagram of a configuration for automatic control of the first regulating plate 2001 in the optical beacon 101. As depicted in FIG. 26, the optical beacon 101 is made up of a detecting unit 2601, a determining unit 2602, an angle adjusting unit 2603, and a correcting unit 2604. The detecting unit 2601 detects a state when the optical signal is insufficiently received on the vehicle side. Specifically, for example, the detecting unit 2601 is made up of a rainfall meter, a snowfall meter, a light amount measuring device for the optical signal, etc.

The determining unit 2602 determines an angle of rotation. Specifically, for example, since the changed angle α is determined as a result of the detection by the detecting unit 2601, the rotation determination is also determined by comparison with the current angle α and a pulse single is generated according to the insufficiency of the angle. If the angle of the first regulating plate 2001 is changed, the boundary B1 defined as the ending point of the transmission area is also changed according to the changed angle α. Therefore, the determining unit 2602 sends a difference Δα between the default angle α and the changed angle α to the correcting unit 2604. The determining unit 2602 may be implemented by an LSI or may be implemented by the CPU executing a program stored in a memory.

The angle adjusting unit 2603 adjusts the angle α set by the first regulating plate 2001. Specifically, upon receiving the pulse signal and the rotation direction from the detecting unit 2601, the angle adjusting unit 2603 uses one end 2001a of the first regulating plate 2001 attached to the optical beacon as a rotation axis to sway the other end 2001b, the rotation being controlled via a motor, etc., thereby changing the angle α.

The correcting unit 2604 corrects the position information by a distance corresponding to Δα. The corrected position information is sent to the optical transmitting apparatus 2101. As a result, the optical transmitting apparatus 2101 emits the corrected position information. In this case, a new configuration is added to the vehicle 102. The correcting unit 2604 may be implemented by an LSI or may be implemented by the CPU executing a program stored in the memory.

The vehicle 120 may be configured to perform the correction without providing the correcting unit 2604 on the optical beacon 101. In this case, the optical transmitting apparatus 2101 transmits the difference Δα to the vehicle 102. Since the vehicle 12 receives the difference Δα along with the position information of the optical beacon 101, the vehicle position may be located precisely by calculating the displacement from the default position of the boundary B1 changed by the difference Δα and correcting the position information.

As described, position location may be implemented according to weather conditions by an adjustability of the set angle of the first regulating plate 2001. In particular, the automatic adjustment enables adaptation to real-time weather conditions and thus, is useful in regions where weather conditions are extremely changeable, especially, in cold regions where manual operations have limitations.

The sixth embodiment has a possibility of optical leakage as depicted by Da in FIG. 22. The boundary of a shadow formed on an optical receiving surface 2701 of the an optical receiving apparatus 2700 blurs as the distance increases between the first regulating plate 2001 and the optical receiving apparatus 2700 (the optical receiving apparatus 300, 1000, and 1100) without the blocking plate 402 and equipped on the vehicle 102. Therefore, the optical receiving apparatus 2700 described in the first to the fifth embodiments may detect the position at which complete blocking occurs more accurately than the sixth embodiment.

The optical signal from the optical beacon 101 may be blocked intentionally by disposing the optical receiving surface 2701 itself tilted without the blocking plate 402, 1002, 1102. An optical signal blocking method for an example where the blocking plate is not provided will be described. The light intensity received at the optical receiving surface 2701 has a characteristic in that the intensity is highest when the optical receiving surface 2701 is fixed at 90 degrees relative to light emitted from a light source and is reduced as the angle departs from 90 degrees.

Figure 27:
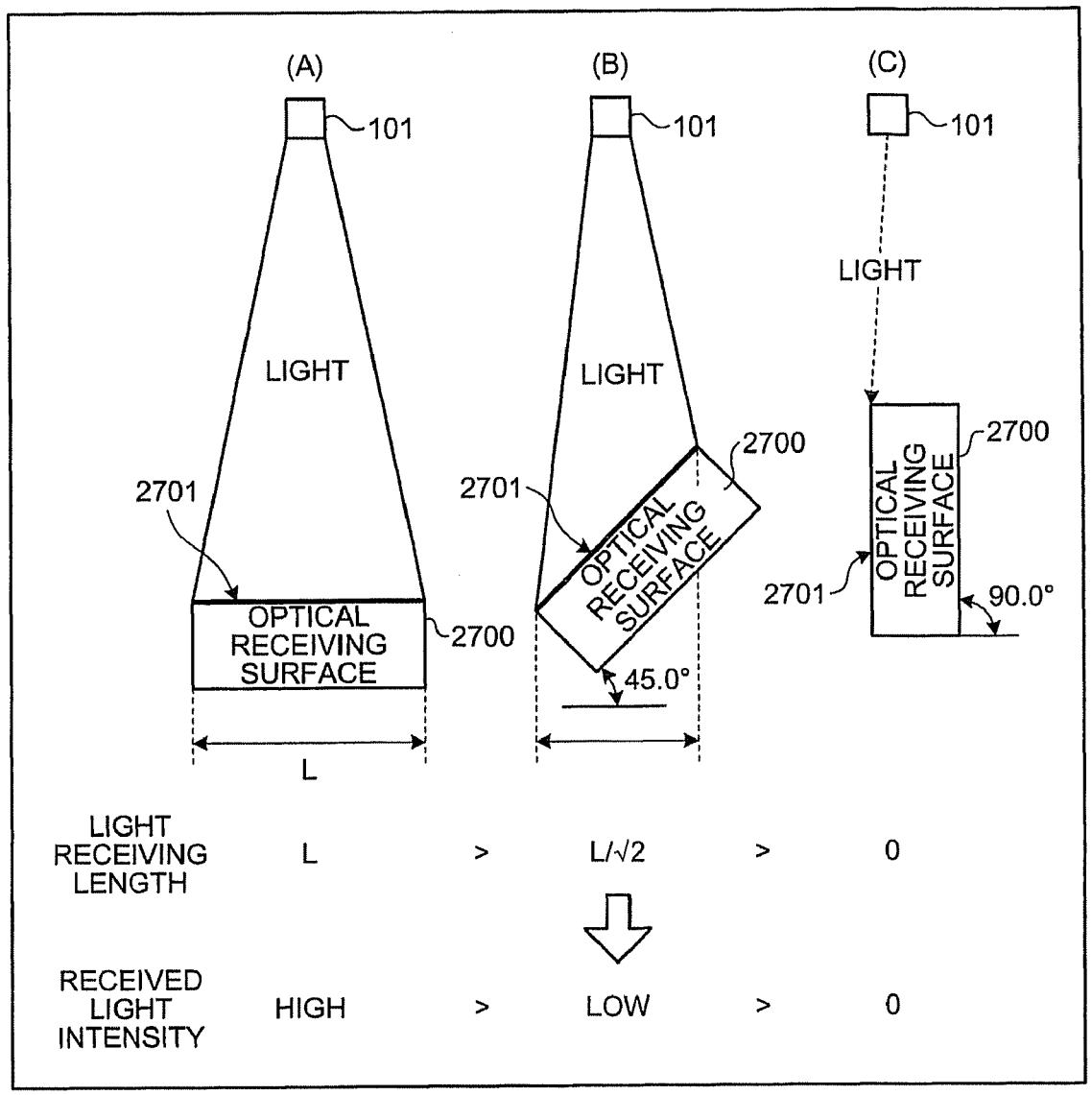
FIG. 27 is an explanatory diagram of changes in the received light intensity due to a tilt of an optical receiving surface.

FIG. 27 is an explanatory diagram of changes in the received light intensity due to a tilt of the optical receiving surface. As depicted in FIG. 27, if the optical receiving surface 2701 is fixed perpendicular to light emitted from a light source such as an optical beacon, the optical receiving surface 2701 is able to receive the light with an optical receiving surface length L, as depicted in section (A) of FIG. 27.

If the optical receiving surface 2701 is tilted, the optical receiving surface 2701 is reduced from the viewpoint of the optical beacon 101 that is the light source and, for example, if the optical receiving surface 2701 is tilted at 45 degrees relative to the light from the optical beacon 101, the light is received by L/42, as depicted in section (B) of FIG. 27.

When the optical receiving surface 2701 is tilted further relative to the optical beacon 101, the optical receiving surface length capable of receiving light is reduced and the light intensity (received light intensity) at the optical receiving surface 2701 is also reduced. If the optical receiving surface 2701 is set parallel to the light from the optical beacon 101 (as depicted FIG. 27C), no light reaches the optical receiving surface 2701 and a state identical to that of blocking the light is achieved.

Figure 28:
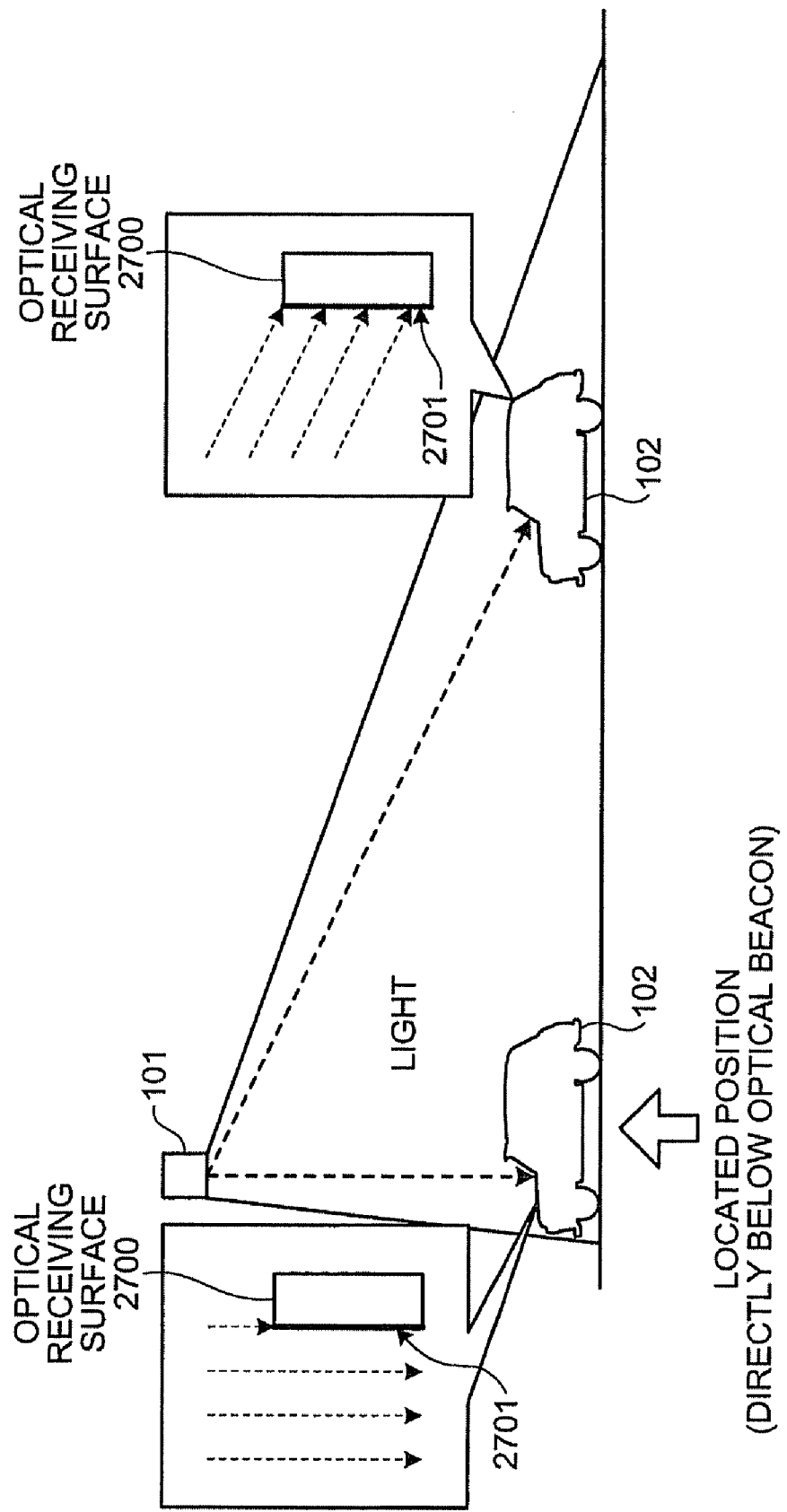
FIG. 28 is an explanatory diagram of an example of the light blocking by the tilt of the optical receiving surface.

FIG. 28 is an explanatory diagram of an example of the light blocking by the tilt of the optical receiving surface 2701. As depicted in FIG. 28, the tilt of the optical receiving surface 2701 may be utilized to generate the light blocking at an arbitrary point. For example, if the light is to be blocked directly below the optical beacon 101, this is implemented by making the optical receiving surface 2701 parallel to the light from the optical beacon 101 (perpendicular to the ground). The incident angle of the light from the light source to the optical receiving surface 2701 changes as the vehicle 102 approaches the light source, and the tilt of the optical receiving surface 2701 relative to the light from the optical beacon 101 becomes closer to parallel. Since the angle between the optical receiving surface 2701 and the light from the optical beacon 101 becomes parallel at a point directly below the optical beacon 101, the light blocking occurs.

Figure 29:
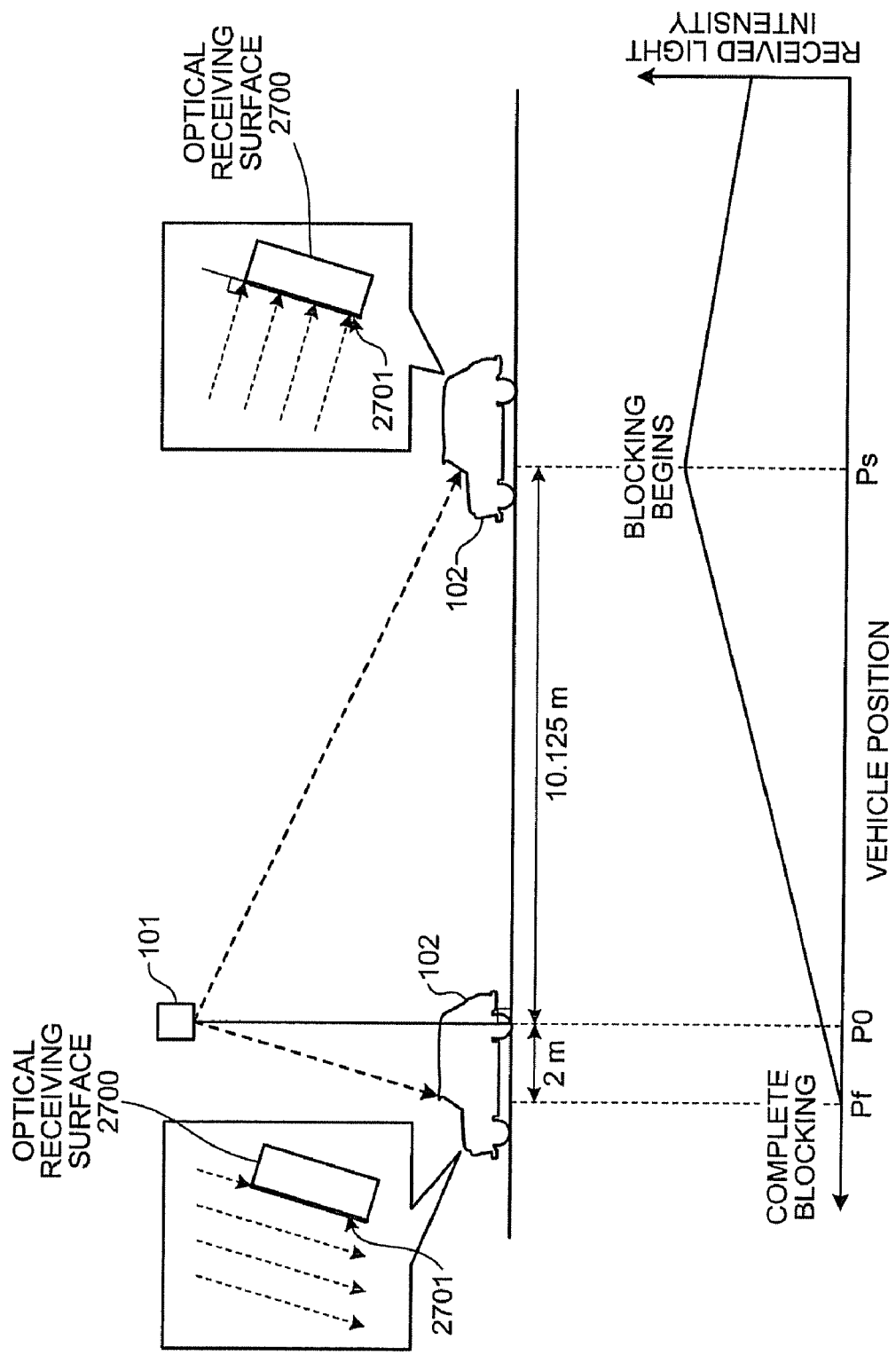
FIG. 29 is an explanatory diagram of the starting point of light blocking and the point of complete light blocking.

FIG. 29 is an explanatory diagram of the starting point of light blocking and the point of complete light blocking. As depicted in FIG. 29, the points at which the light blocking begins and at which complete blocking occurs may be set by the tilt of the optical receiving surface. For example, when a point directly below the optical beacon 101 is set as a reference point P0 and a point located 2 m forward from the reference point P0 from the viewpoint of the vehicle 102 is set as a complete light blocking point Pf, this may be implemented by setting the disposition angle of the optical receiving surface 2701 to approximately 66 degrees relative to the ground.

Accordingly, a light blocking starting point Ps is set to a point located 10.125 m backward from the reference point from the viewpoint of the vehicle 102. As the vehicle 102 approaches the optical beacon 101, the disposition angle of the optical receiving surface 2701 and the light from the optical beacon 101 become closer to parallel and, therefore, the received light intensity is reduced. The reduction of the received light intensity begins from the point with the highest received light intensity. The light blocking starting point Ps is set to a point where the incident angle of the light from the optical beacon 101 becomes perpendicular to the disposition angle of the optical receiving surface 2701.

Figure 30:
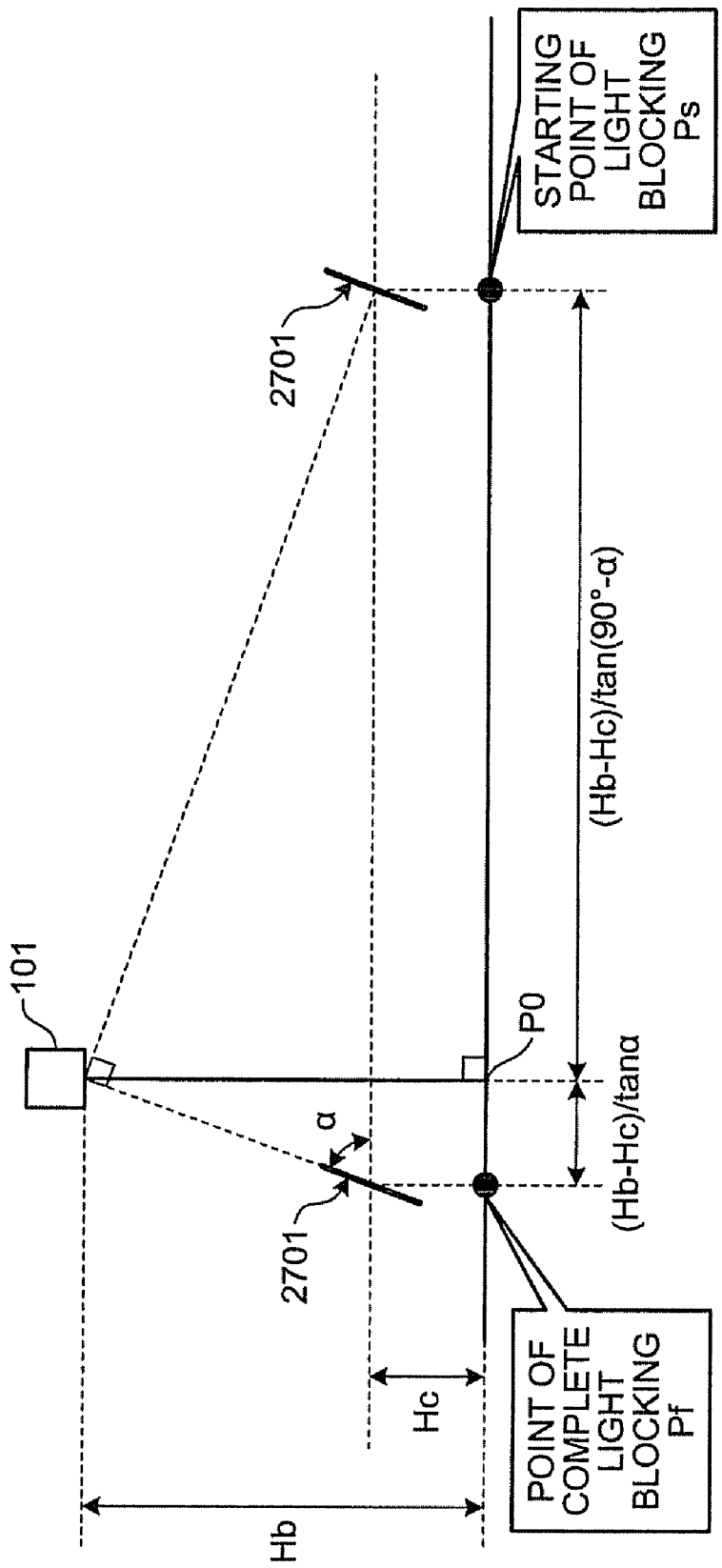
FIG. 30 is an explanatory diagram of a method of calculating the starting point of light blocking and the point of complete blocking using the angle of the optical receiving surface 2701.

FIG. 30 is an explanatory diagram of a method of calculating the starting point of light blocking and the point of complete blocking using the angle of the optical receiving surface 2701. The light blocking starting point Ps and the complete light blocking point Pf may be determined by the tilt of the optical receiving surface 2701. If Hc denotes a height from the ground to the optical receiving surface 2701 and Hb denotes a height to the optical beacon 101, it is assumed that the optical receiving surface 2701 is tilted at α degrees. The distance from the point directly below the optical beacon 101 to the light blocking starting point Ps is $(Hb-Hc)/\tan(90°-\alpha)$ and the distance from the point directly below the optical beacon 101 to the complete light blocking point Pf is $(Hb-Hc)/\tan\alpha$.

As described, the light blocking starting point Ps and the complete light blocking point Pf of the optical signal may be set by disposing the optical receiving surface 2701 in a tilted manner. However, the optical receiving apparatus 2700 that includes the blocking plate according to the first to the fifth embodiments has the following advantages (1) to (3) over the optical receiving apparatus 2700 disposed with the optical receiving surface 2701 tilted and without the blocking plate.

(1) The light blocking starting point and complete light blocking point may be set independently.

In the optical receiving apparatus described in the first to the fifth embodiments, since the parameter related to the setting of the start of light blocking is the blocking plate angle and the parameter related to the setting of the complete light blocking point is the blocking plate height (a relationship between the position of the blocking plate leading end and the optical receiving surface), the parameters are independent from each other. Therefore, the light blocking starting point and the complete light blocking point may independently be set.

On the other hand, in the optical receiving apparatus 2700 disposed with the optical receiving surface 2701 tilted and without the blocking plate described with respect to FIGS. 27 to 30, both the light blocking starting point Ps and the complete light blocking point Pf are determined by the angle of tilt of the optical receiving surface 2701. The optical receiving apparatus described in the first to the fifth embodiments including the blocking plate is more advantageous in terms of flexibility in the setting of the light blocking points than the optical receiving apparatus disposed with the optical receiving surface tilted and without the blocking plate.

(2) The light blocking points may be set at points having a higher received light intensity.

Substantially no light reaches the optical receiving surface 2701 after passing the optical beacon 101. As the optical receiving surface 2701 moves further away from the optical beacon 101, the received light intensity on the optical receiving surface 2701 is reduced further. Since it is difficult to detect the blocking of the light if the received light intensity is low, the performance of the optical receiving apparatus must be made higher to detect the light blocking at a point having a lower received light intensity.

Since the light blocking starting point may be provided in the vicinity of the optical beacon due to the blocking plate of the optical receiving apparatus described in the first to the fifth embodiments, the light blocking starting point may be set at a point having a higher received light intensity. Since the light may be blocked at a point having a higher received light intensity, the blocking is easily detected even by a less precise optical receiving apparatus.

On the other hand, in the optical receiving apparatus 2700 disposed with the optical receiving surface 2701 tilted and without the blocking plate, the optical receiving surface 2701 must be set at the disposition angle of about 0 to 30 degrees to block the light at a point having a higher received light intensity, i.e., in the vicinity of the point directly below the optical beacon 101. If the disposition angle of the optical receiving surface 2701 is zero degrees, the light blocking starting point Ps is a point where the light emitted from the optical beacon 101 is parallel to the ground.

Since the optical beacon 101 is disposed at a position higher than the optical receiving surface 2701, the optical receiving surface 2701 is theoretically unable to exist at a position where the emitted light from the optical beacon 101 is parallel to the ground. Since the light blocking has already been started at the time of the entry into the communication area of the optical beacon 101, the received light intensity (reception intensity) necessary for receiving the optical signal and analyzing contents of the signal may not be acquired.

(3) Effects of the optical beacon on the adjacent lane may be eliminated.

According to the optical receiving apparatus described in the first to the fifth embodiments, the optical signal from the optical beacon for an adjacent lane may be cut off by expanding the width of the blocking plate. Therefore, the blocking of the optical signal from the optical beacon 101 provided for the traveled lane may be detected accurately. On the other hand, in the optical receiving apparatus 2700 disposed with the optical receiving surface 2701 tilted and without the blocking plate, since nothing blocks the optical signal from the optical beacon of an adjacent lane, the light therefrom may be received, resulting in false detection of the light blocking.

As described, according to the present embodiments, by blocking the optical signal at a boundary position appropriately set by a simple and inexpensive configuration, a reference position serving as a reference for autonomous positioning may be set and highly accurate vehicle position location may be performed to achieve effective utilization of existing facilities.

According to the present embodiments, since services useful to vehicles C traveling through an intersection 1230 may be provided to each of the vehicles C passing through the intersection 1230 by way of highly accurate vehicle position location, the safety (of the driver) of the vehicle C traveling through the intersection 1230, pedestrians, etc. may be improved while achieving effective utilization of existing facilities.

Although an example employing an optical signal has been described in the first to the sixth embodiments, the present invention is not limited to an optical signal, and a communication device transmitting electromagnetic waves having a straight advancing property and capable of carrying signals may be used. In this case, a receiving apparatus may include a blocking plate made of a material capable of blocking the electromagnetic waves and a receiving unit capable of detecting the electromagnetic waves.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical receiving apparatus provided on a mobile object and comprising:
    a receiving unit that receives an optical signal transmitted from a transmitting unit of a communication device disposed apart from the mobile object; and
    a blocking unit that blocks the optical signal when an incident angle of the optical signal relative to a disposition surface of the receiving unit becomes equal to or greater than a predetermined incident angle, wherein the optical signal is blocked at a point where the optical signal is strongest.

2. The optical receiving apparatus according to claim 1, wherein the blocking unit is a blocking plate provided on an incoming optical path of the optical signal to the receiving unit.

3. The optical receiving apparatus according to claim 1, wherein the predetermined incident angle is set based on a height from a road surface to the transmitting unit, a height from the road surface to the receiving unit, and a distance between the receiving unit and a perpendicular line from the transmitting unit to the road surface.

4. The optical receiving apparatus according to claim 1, wherein the predetermined incident angle is set based on a height from the communication device to the receiving unit and a distance between the receiving unit and a perpendicular line from the transmitting unit to the ground.

5. A non-transitory computer-readable recording medium storing therein a transit support program that causes a computer equipped on a vehicle to execute:
    detecting passage of the vehicle through an initial position on a road along which the vehicle is traveling toward an intersection of the road, based on a light receiving state of an optical receiving apparatus equipped on the vehicle and comprising a receiving unit that receives an optical signal transmitted from a transmitting unit of a communication device disposed apart from the mobile object, and a blocking unit that blocks the optical signal when an incident angle of the optical signal relative to a disposition surface of the receiving unit becomes equal to or greater than a predetermined incident angle, wherein the optical signal is blocked at a point where the optical signal is strongest;
    acquiring information concerning a position of the vehicle relative to the initial position, if the passage of the vehicle has been detected at the detecting, the vehicle continuing to travel after passing the initial position;
    identifying a position of the vehicle with respect to the intersection, based on the information acquired at the acquiring;
    extracting, from traffic information concerning the intersection and correlated with positions at the intersection, specific traffic information correlated with the position identified at the identifying; and outputting the specific traffic information extracted at the extracting.

6. The non-transitory computer-readable recording medium according to claim 5 and storing therein the transit support program that further causes the computer to execute:
    determining priorities when plural items of the specific traffic information are extracted at the extracting, the priorities being correlated respectively to the items of the specific traffic information extracted at the extracting, wherein the outputting includes sequentially outputting the items of the specific traffic information according to the priorities determined at the determining.

7. The non-transitory computer-readable recording medium according to claim 6, wherein the determining includes determining the priorities based on at least one type of information among information concerning the vehicle, information concerning the environment around the vehicle, and biological information concerning a driver of the vehicle.

8. The non-transitory computer-readable recording medium according to claim 5 and storing therein the transit support program that further causes the computer to execute:
    judging whether the position identified at the identifying is a position within a service execution area indicated by coordinates relative to the initial position, wherein
    the outputting includes, based on a judgment result at the judging, outputting the specific traffic information if the position of the vehicle is within the service execution area and terminating output if the position of the vehicle subsequently is outside the service execution area.

9. The non-transitory computer-readable recording medium according to claim 8 and storing therein the transit support program that further causes the computer to execute:
  accepting an input of area specification information specifying center coordinates of the service execution area and a size of the service execution area, wherein
  the judging step includes judging whether the position identified at the identifying is a position within the service execution area based on the area specification information accepted at the accepting.

10. The non-transitory computer-readable recording medium according to claim 8, wherein
  the extracting includes extracting information concerning the service execution area from the optical signal received by the optical receiving apparatus, and
  the judging includes judging whether the position is within the service execution area based on the information extracted at the extracting.

11. A transit support apparatus equipped on a vehicle and comprising:
  an optical receiving apparatus that comprises
  a receiving unit that receives an optical signal transmitted from a transmitting unit of a communication device disposed apart from the mobile object, and
  a blocking unit that blocks the optical signal when an incident angle of the optical signal relative to a disposition surface of the receiving unit becomes equal to or greater than a predetermined incident angle, wherein the optical signal is blocked at a point where the optical signal is strongest;
  a detecting unit that detects passage through an initial position on a road along which the vehicle is traveling toward an intersection of the road, based on a light receiving state of the optical receiving apparatus;
  an acquiring unit that, if passage through the initial position is detected by the detecting unit, acquires information concerning displacement of the vehicle with respect to the initial position, the vehicle continuously moving after passing the initial position;
  an identifying unit that identifies a position of the vehicle with respect to the intersection based on the information acquired by the acquiring unit;
  an extracting unit that extracts specific traffic information correlated with the identified position, from traffic information concerning the intersection and stored in a storage device equipped on the vehicle, the traffic information being correlated with positions at the intersection; and
  an output unit that outputs the specific traffic information extracted by the extracting unit.

12. The transit support apparatus according to claim 11, further comprising:
  a determining unit that determines priorities when plural items of the specific traffic information are extracted by the extracting unit, the priorities being correlated respectively to the items of the specific traffic information extracted by the extracting unit, wherein
  the output unit sequentially outputs the items of the specific traffic information according to the priorities determined by the determining unit.

13. The transit support apparatus according to claim 12, wherein
  the determining unit determines the priorities based on at least one type of information among information concerning the vehicle, information concerning the environment around the vehicle, and biological information concerning a driver of the vehicle.

14. The transit support apparatus according to claim 11, further comprising:
  a judging unit that judges whether the position identified by the identifying unit is a position within a service execution starting area or a service execution ending area indicated by coordinates relative to the initial position, wherein
  the output unit, based on a judgment result of the judging unit, starts outputting the specific traffic information if the position identified by the identifying unit is located within the service execution starting area and terminates output of the specific traffic information if the position identified by the identifying unit is located within the service execution ending area.

* * * * *